(12) United States Patent
Furukawa et al.

(10) Patent No.: US 7,603,520 B2
(45) Date of Patent: Oct. 13, 2009

(54) RECORD APPARATUS, RECORD METHOD, AND PROGRAM FOR WRITING DATA TO OPTICAL DISC IN A SECOND UNIT LARGER THAN A FIRST UNIT

(75) Inventors: Takashi Furukawa, Kanagawa (JP); Motohiro Terao, Kanagawa (JP)

(73) Assignee: Sony Corporation, Tokyo (JP)

( * ) Notice: Subject to any disclaimer, the term of this patent is extended or adjusted under 35 U.S.C. 154(b) by 459 days.

(21) Appl. No.: 11/400,228

(22) Filed: Apr. 10, 2006

(65) Prior Publication Data

US 2006/0236023 A1 Oct. 19, 2006

(30) Foreign Application Priority Data

Apr. 15, 2005 (JP) .............................. 2005-119041

(51) Int. Cl.
*G06F 12/00* (2006.01)
(52) U.S. Cl. ................. 711/118; 711/112; 711/113; 711/117; 711/154; 711/170
(58) Field of Classification Search ........................ None
See application file for complete search history.

(56) References Cited

U.S. PATENT DOCUMENTS 5,933,847 A 8/1999 Ogawa
5,986,980 A * 11/1999 Takeshita et al. ......... 369/30.23
6,604,168 B2 8/2003 Ogawa
2002/0012297 A1 * 1/2002 Suzuki ..................... 369/47.3
2003/0215212 A1 11/2003 Furukawa et al.

FOREIGN PATENT DOCUMENTS

| JP | 8-101783 | 4/1996 |
|---|---|---|
| JP | 8-115238 | 5/1996 |
| JP | 9-97206 | 4/1997 |
| JP | 11-195287 | 7/1999 |
| JP | 2004-5895 | 1/2004 |
| JP | 2004-38595 | 2/2004 |
| JP | 2005-044465 | 2/2005 |
| WO | WO 2005/024792 A2 | 3/2005 |

* cited by examiner

*Primary Examiner*—Reginald G Bragdon
*Assistant Examiner*—Shawn X Gu
(74) *Attorney, Agent, or Firm*—Oblon, Spivak, McClelland, Maier & Neustadt, L.L.P.

(57) ABSTRACT

A record apparatus is disclosed. The record apparatus has a memory, a record section, and a record control section. The memory stores data in a first unit. The record section writes data to an optical disc in a second unit larger than the first unit. The record control section controls the record section, which writes data to the optical disc. The record control section reads data in the second unit from the memory, causes the record section to write data that have been read from the memory to the optical disc, closes the second unit in which the data of the optical disc have been written, and sets a write start position of the optical disc to a second unit followed by the closed second unit.

13 Claims, 17 Drawing Sheets

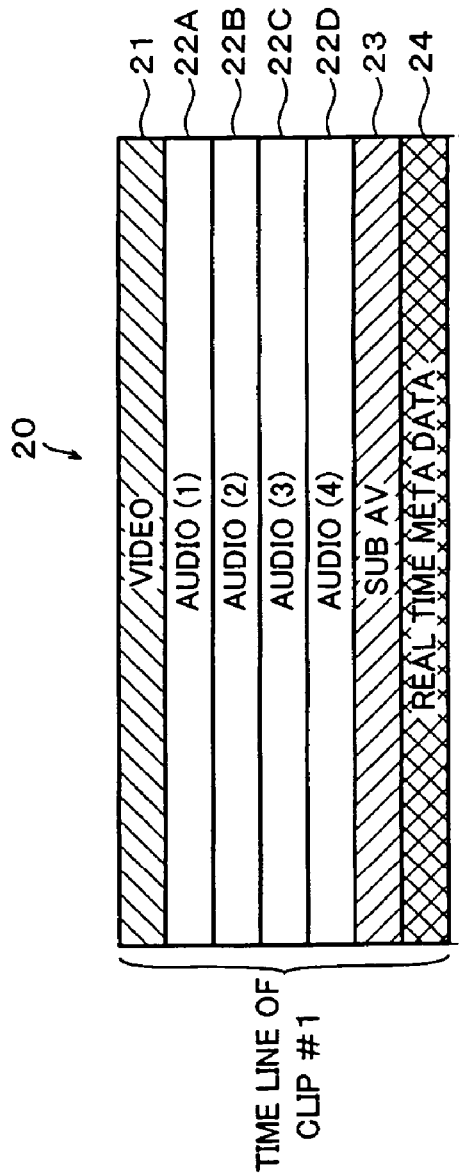
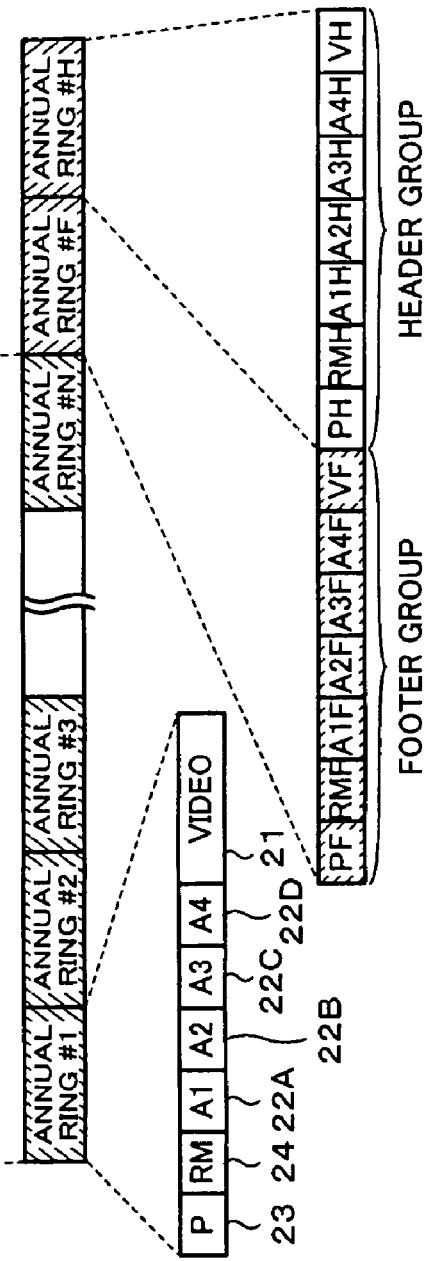
*Fig. 2A*
*Fig. 2B*
*Fig. 2C*
*Fig. 2D*

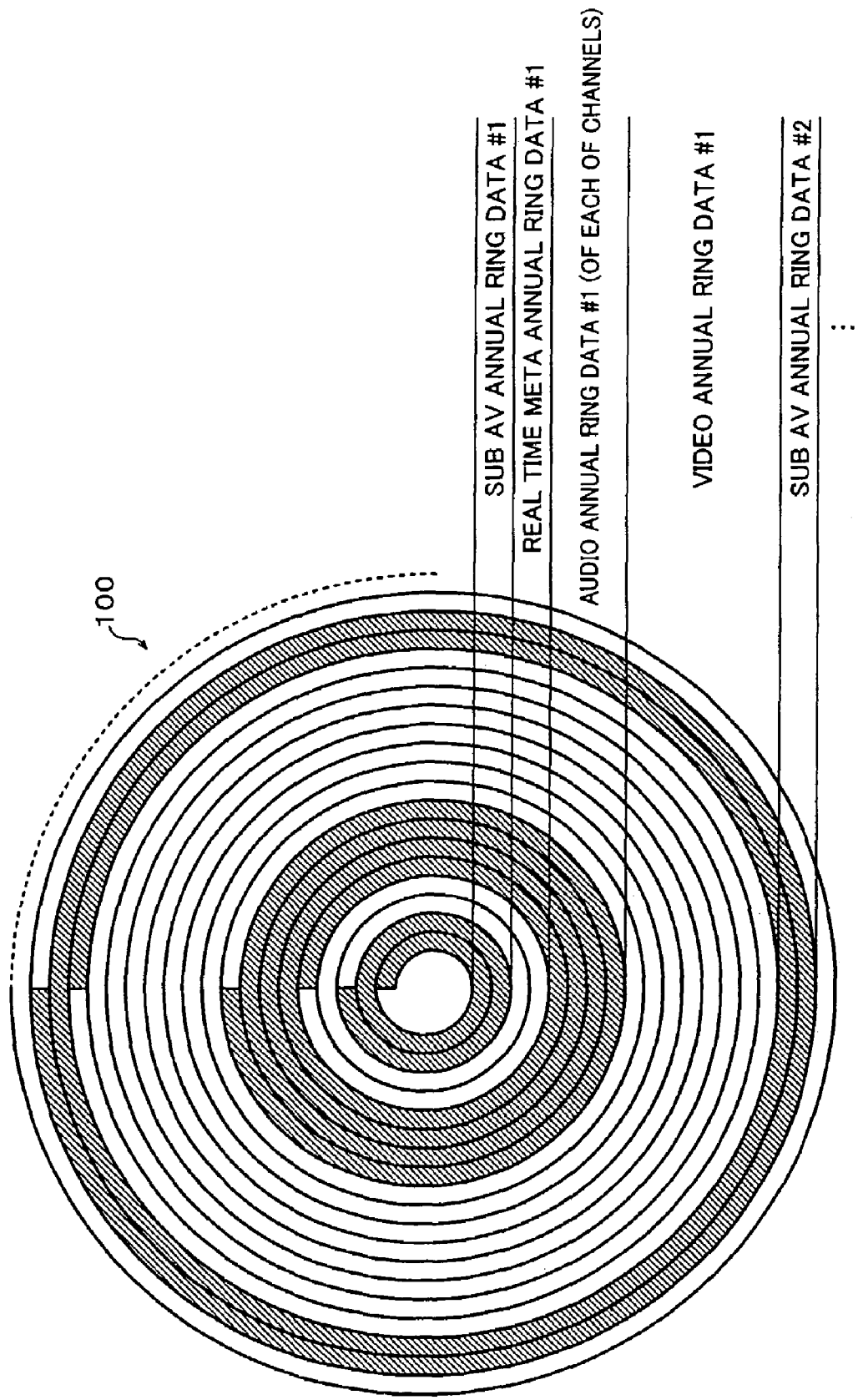

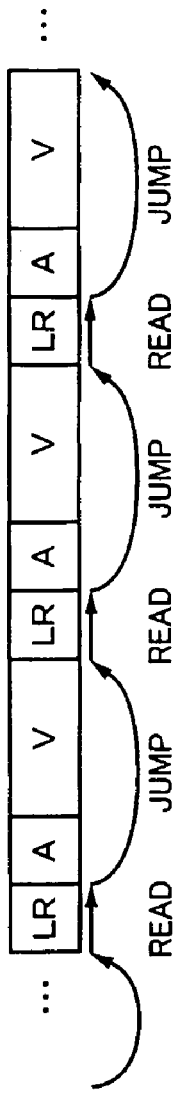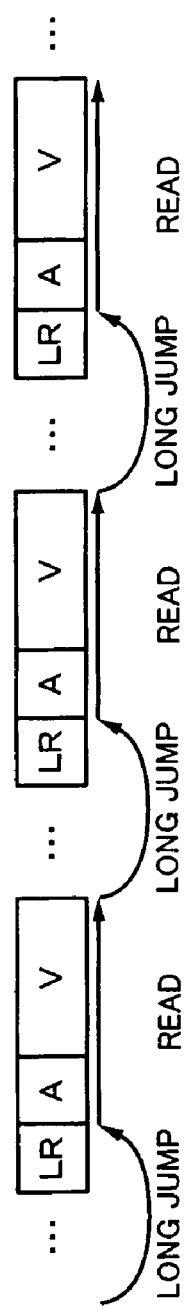
Fig. 5A
Fig. 5B
Fig. 5C

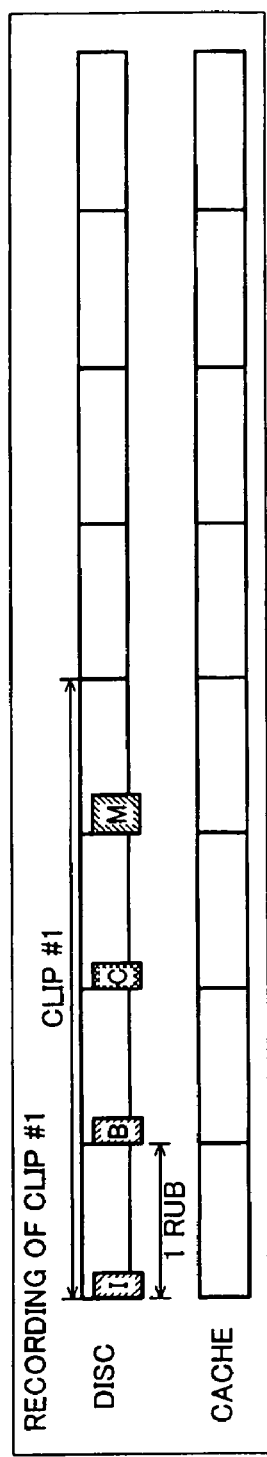
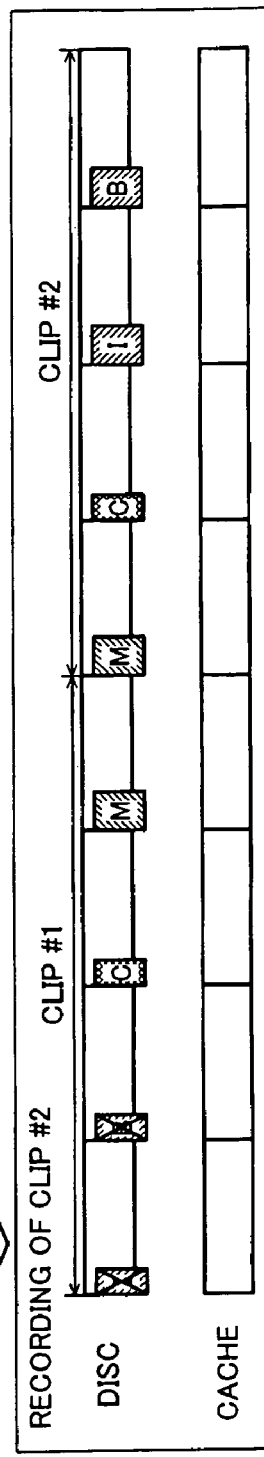
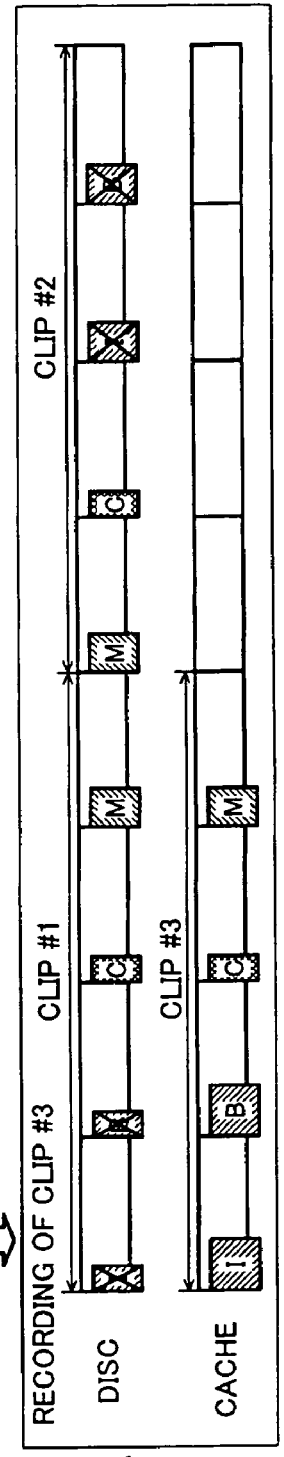

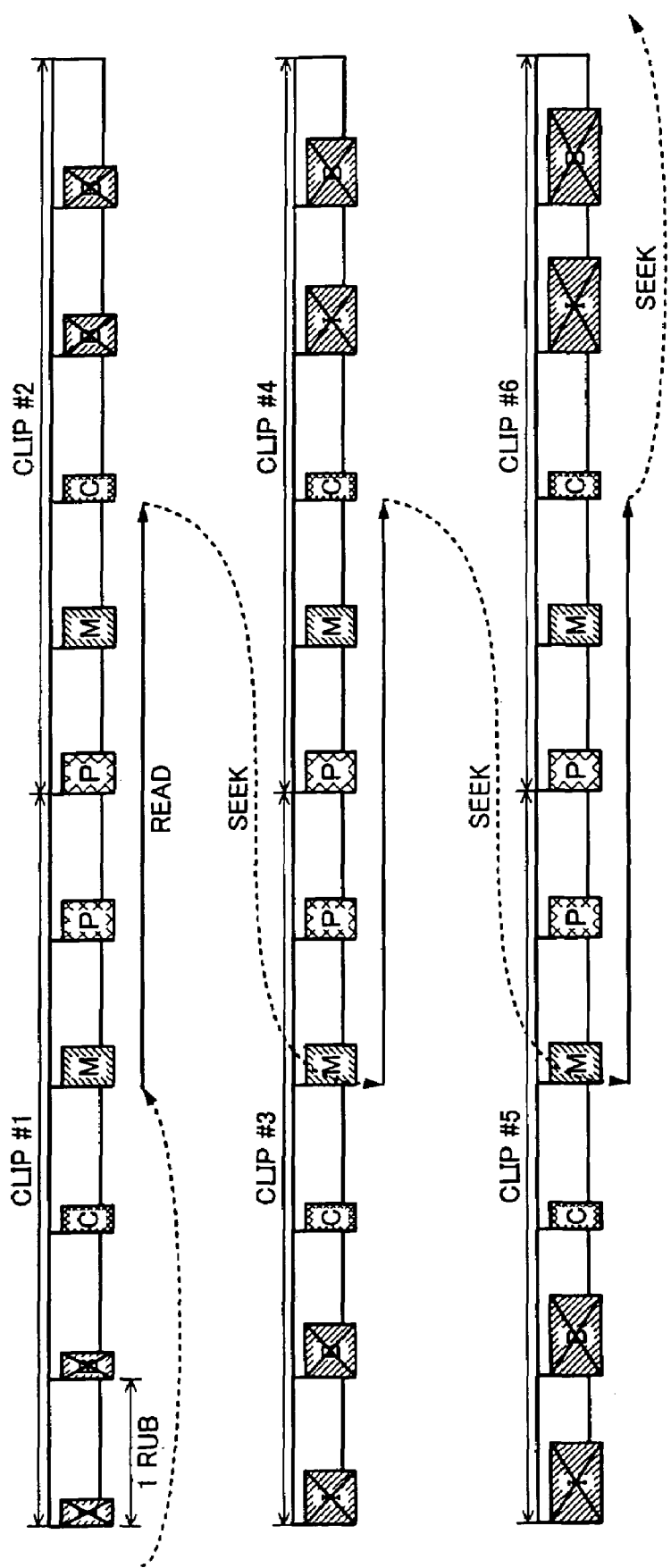

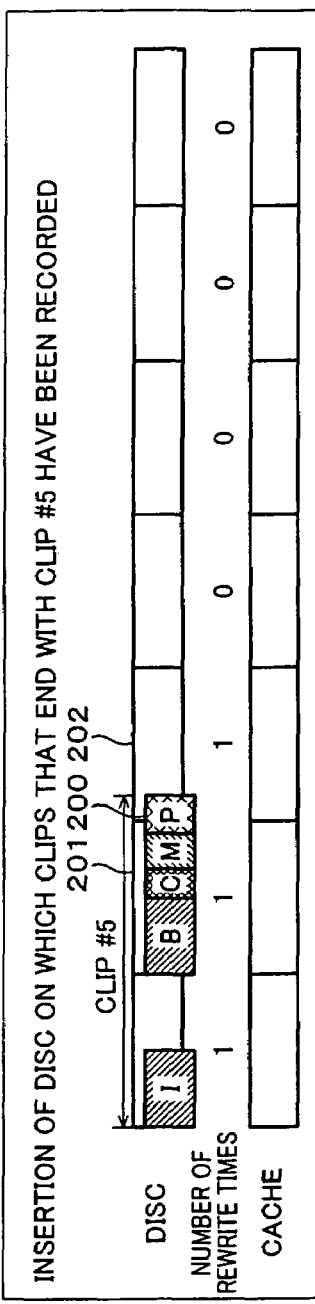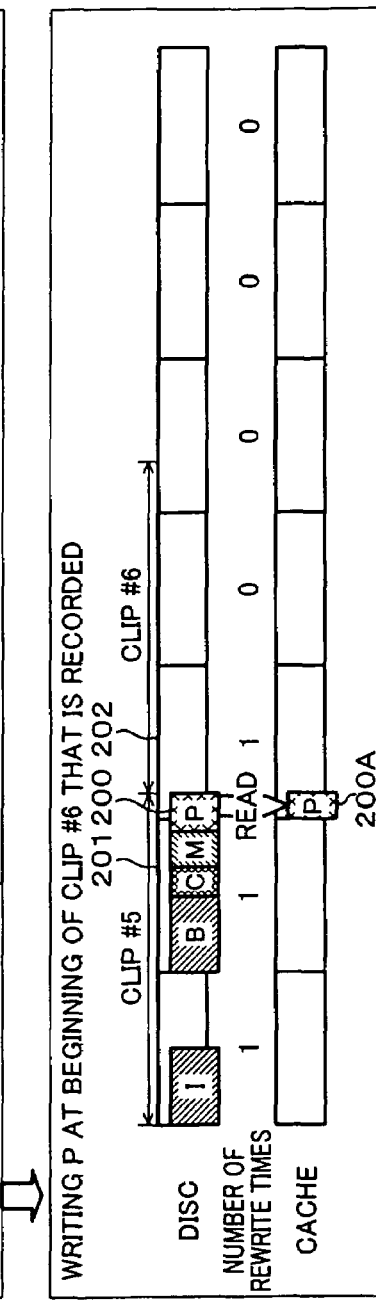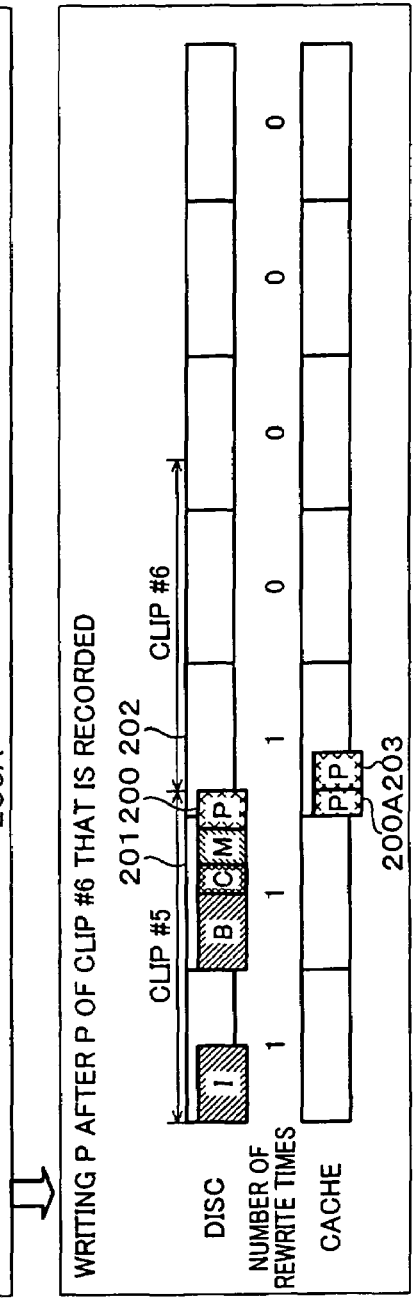

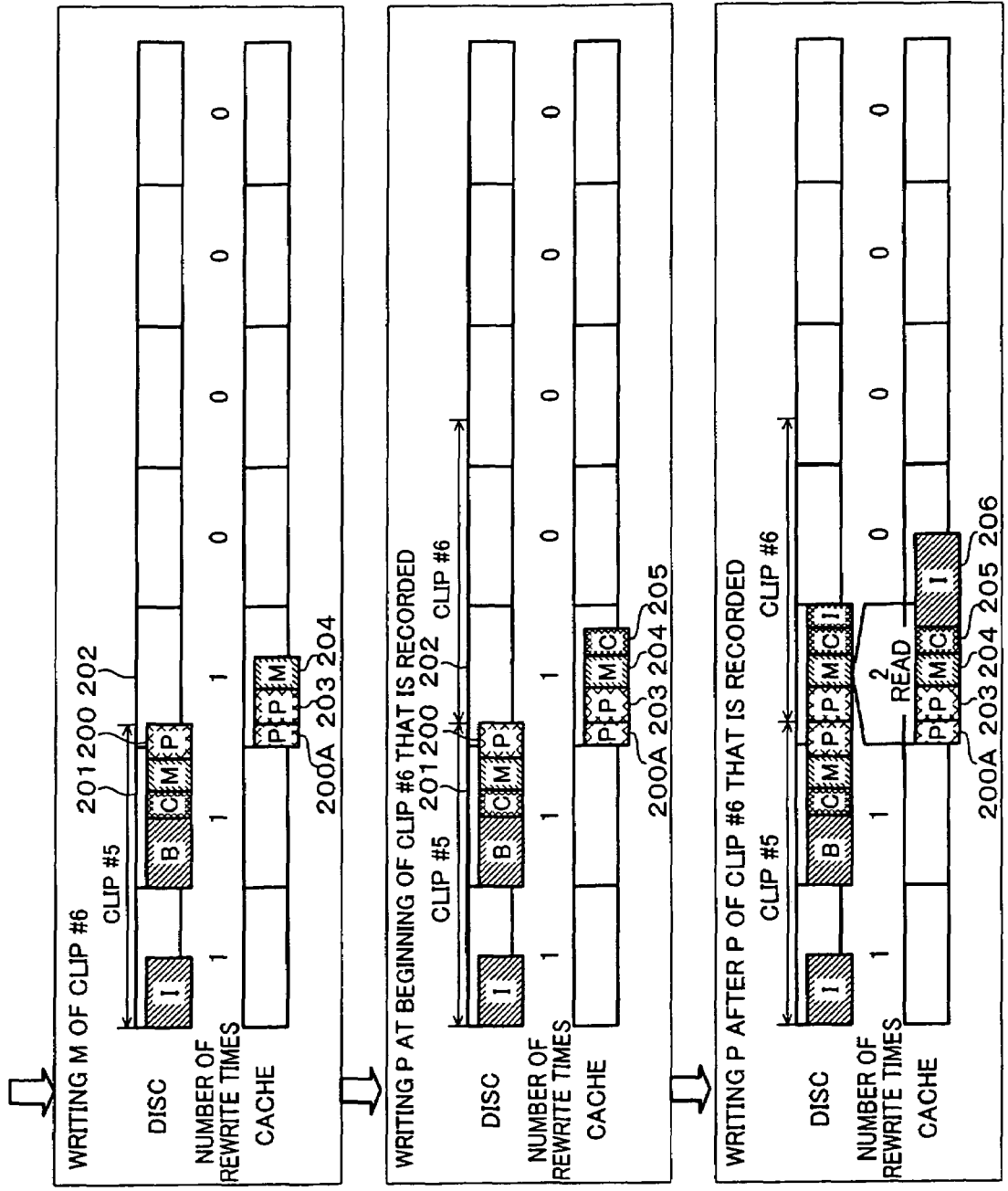

RECORD APPARATUS, RECORD METHOD, AND PROGRAM FOR WRITING DATA TO OPTICAL DISC IN A SECOND UNIT LARGER THAN A FIRST UNIT

CROSS REFERENCES TO RELATED APPLICATIONS

The present invention contains subject matter related to Japanese Patent Application No. 2005-119041 filed in the Japanese Patent Office on Apr. 15, 2005, the entire contents of which being incorporated herein by reference.

BACKGROUND OF THE INVENTION

1. Field of the Invention

The present invention relates to a record apparatus, a record method, and a program thereof that allow a record operation to be effectively performed when a record unit of data of a record medium in particular an optical disc is different from a management unit of data of a file system.

2. Description of the Related Art

In recent years, optical discs that allow a large amount of data to be recorded and reproduced using a laser beam having a short wavelength as a light source have come out. For example, a record capacity of 23 GB (Gigabytes) using a blue-purple laser that emits a laser beam having a wavelength of 405 nm as a light source and that has a single-side one-layer optical disc has been accomplished.

This optical disc has been proposed for a record medium for a video/audio device used in a broadcasting station. This optical disc is loaded into a video camera or a camera controller connected thereto. Video data corresponding to a picture photographed by a video camera is recorded to the loaded optical disc. In addition, sound associated with the picture is collected by a microphone. Audio data corresponding to the collected sound is recorded to the optical disc. The video data and the audio data are recorded for example as different files for each clip. A clip is a block of data for which a photographing operation is started until it is stopped.

United States Patent Application Unexamined Publication No. US2003/0215212 describes a device that records a low resolution sub video signal along with a high resolution main video signal to an optical disc.

A unit in which AV data are recoded and reproduced to and from an optical disc may be as large as 64 kB (kilobytes). On the other hand, as a file system for an optical disc, UDF (Universal Disk Format) has become common. The UDF manages data that are recorded and reproduced in a unit of 2 kB.

Next, a record process performed when a data size of a record/reproduction unit of a record medium is different from a data size of a management unit of a file system will be described. In this example, it is assumed that the record medium is an optical disc having a record/reproduction unit of 6 kB and the file system has a management unit of 2 kB.

When a file having a data size of for example 70 kB is written from the beginning of each record unit, 64 kB of 70 kB is written to the first record unit #1. The remaining 6 kB is written to the next record unit #2. This record process is accomplished by a function called a cache that temporarily stores data corresponding to the record/reproduction unit of the record medium to a buffer memory or the like.

When data of one record unit are stored in the buffer or when an unload command for an optical disc is issued from a drive, data for the cached record unit are read from the memory and written to the optical disc.

Now, it is assumed that the optical disc on which data of 70 kB have been written is unloaded from the drive, the disc is loaded into the drive, and then data are recorded on the disc. In this case, a write control called the read modify write using a cache is normally performed. Next, the read modify write will be described in brief.

Data are read from the record unit #2. The read data are cached to a buffer memory or the like. In this example, since data of 6 kB have been written to the record unit #2, the data of 6 kB are cached. The newly recorded data are preceded by the cached data. When the amount of cached data becomes 64 kB, the cached content is overwritten to the record unit #2 of the optical disc.

When the read modify write is used, even if the data size of the management unit of the file system is smaller than the data size of the record/reproduction unit of the record medium, data can be recorded and reproduced in the management unit of the file system.

SUMMARY OF THE INVENTION

However, when data are written by the foregoing read modify write, data of one record unit are temporarily read from the optical disc and then data of one record unit are written to the optical disc again. Thus, it takes an extra time for the record operation.

In particular, since a video camera used for a broadcasting station needs to be quickly operated, if the video camera cannot be quickly started, a problem will arise.

In the read modify write, as described above, after data for one record unit are read from the optical disc, data for one record unit are written to the physically same position as the read position. Thus, the write operation is performed for the area of the record unit of the optical disc two times. As a result, it becomes difficult to equalize the number of times data are rewritten in each area of the optical disc.

In other words, a record medium has an upper limit of the number of times data are rewritten. However, the number of times data are written in an optical disc is lower than that of other random access record mediums such as a hard disk and a semiconductor memory. Thus, unless the number of times data are rewritten in each area is equalized, the life of the optical disc will become short. As a result, the reliability of recorded data will deteriorate.

In view of the foregoing, it would be desirable to provide a record apparatus, a record method, and a program thereof that allow data to be quickly recorded and the number of times data are recorded in each area of the record medium to be equalized when a data record unit of a record medium in particular an optical disc is different from a data management unit of a file system.

According to an embodiment of the present invention, there is provided a record apparatus that has a memory, a record section, and a record control section. The memory stores data in a first unit. The record section writes data to an optical disc in a second unit larger than the first unit. The record control section controls the record section, which writes data to the optical disc. The record control section reads data in the second unit from the memory, causes the record section to write data that have been read from the memory to the optical disc, closes the second unit in which the data of the optical disc have been written, and sets a write start position of the optical disc to a second unit followed by the closed second unit.

According to an embodiment of the present invention, there is provided a record method. Data are stored in a first unit to a memory. Data in a second unit are read from the memory. The second unit being larger than the first unit. The read data in the second unit are written to the optical disc. The second unit in which the data of the optical disc have been written is closed. A write start position of the optical disc is to a second unit followed by the closed second unit.

According to an embodiment of the present invention, there is provided a record program that causes a computer device to execute a record method. Data in a first unit are stored to a memory. Data in a second unit are read from the memory. The second unit is larger than the first unit. The read data in the second unit are written to the optical disc. The second unit in which the data of the optical disc have been written is closed. A write start position of the optical disc is set to a second unit followed by the closed second unit.

As described above, according to an embodiment of the present invention, when data that have been stored in a first unit to a memory are recorded in a second unit to an optical disc, the second unit being larger than the first unit, data are read in the second unit from the memory. The read data are written to the optical disc. The second unit to which the data of the optical disc have been written is closed. A write start position to the optical disc is set to a second unit preceded by the closed second unit. Thus, data managed in the first unit can be recorded in the second unit to the optical disc without need to perform data modify write. In addition, the number of rewrite times in the second unit of the optical disc can be equalized.

According to an embodiment of the present invention, when data that have been stored in a management unit of a file system to a memory are recorded in the minimum record unit of an optical system thereto, the minimum record unit of the optical system being larger than the management unit of the file system, data are read in the minimum record unit of the optical system from the memory. The read data are written to the optical disc. The minimum record unit to which the data of the optical disc have been written is closed. A write start position of the optical disc is set to the minimum record unit followed by the closed minimum record unit. Thus, data managed in the management unit of the file system can be recorded in the minimum record unit of the optical disc thereto without need to perform data modify write. Thus, the record speed is improved.

In addition, data that have been read from a memory are written to an optical disc. The minimum record unit to which data of the optical disc have been written is closed. A write start position to the optical disc is set to the minimum record unit preceded by the closed minimum record unit. Thus, the number of rewrite times in the minimum record unit of the optical disc can be equalized.

These and other objects, features and advantages of the present invention will become more apparent in light of the following detailed description of a best mode embodiment thereof, as illustrated in the accompanying drawings.

BRIEF DESCRIPTION OF THE DRAWINGS

The invention will become more fully understood from the following detailed description, taken in conjunction with the accompanying drawings, wherein similar reference numerals denote similar elements, in which:

FIG. 2A, FIG. 2B, FIG. 2C, and FIG. 2D are schematic diagrams showing an example of data that composes a clip;

FIG. 3 is a schematic diagram showing an example of annual ring data formed on an optical disc;

FIG. 5A, FIG. 5B, and FIG. 5C are schematic diagrams describing that data need to be recorded on an optical disc so that continuity of annual rings is assured;

FIG. 11A, FIG. 11B, and FIG. 11C are schematic diagrams showing an example of a write process of non-real time meta data in an SD format;

FIG. 14 is a schematic diagram showing an example of a write process of non-real time meta data in an HD format;

FIG. 15A, FIG. 15B, and FIG. 15C are schematic diagrams describing an example in the case that read modify write is applied to a file structure according to an embodiment of the present invention;

FIG. 16A, FIG. 16B, and FIG. 16C are schematic diagrams describing an example in the case that read modify write is applied to a file structure according to an embodiment of the present invention.

DETAILED DESCRIPTION OF THE PREFERRED EMBODIMENTS

Figure 1:
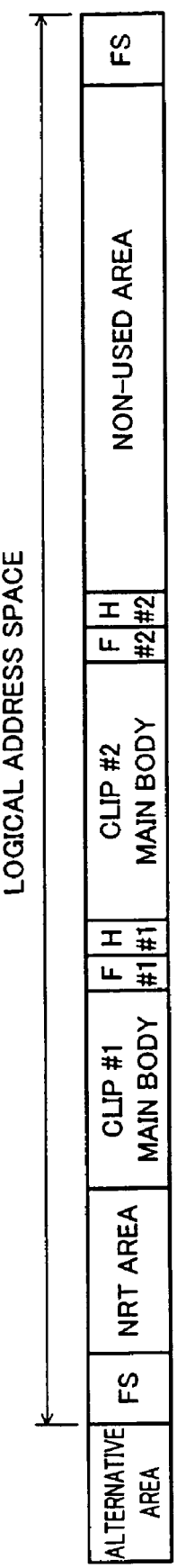
FIG. 1 is a schematic diagram showing an example of a data allocation of a disc-shaped record medium.

Next, with reference to the accompanying drawings, an embodiment of the present invention will be described. To allow the reader of this specification to easily understand an embodiment of the present invention, a record medium and a recording and reproducing apparatus according to an embodiment of the present invention will be described. FIG. 1 shows an example of a data allocation of a disc-shaped record medium. The data allocation shown in FIG. 1 is a normal data allocation of a random accessible disc-shaped record medium such as a recordable optical disc or a hard disk. A logical address space is an area to and from which any data can be recorded and reproduced.

According to this embodiment of the present invention, the record medium is an optical disc. A block size as the minimum record unit of the optical disc is 64 kB (kilobytes). The minimum record unit of the optical disc is referred to as an RUB (Read Unit Block).

A file system FS is allocated at each of a front end and a rear end of logical addresses. Any data are recorded in the logical address space in a predetermined format named a file. Data on the record medium are basically managed as a unit of a file. Management information of files is recorded in the file system FS. A file system layer of a system control section (described later) of the recording and reproducing apparatus references and operates the file system FS. As a result, the file system layer can manage various types of data on one record medium. The file system FS manages files in a unit of 2 kB in for example a UDF (Universal Disk Format).

An alternative area is allocated outside the logical address space. The alternative area is an area that can be alternatively used when data cannot be physically read and written from and to the record medium because a part thereof has a defect. When the record medium is accessed (in particular, when data are recorded), if a defect area is detected, an alternative process is normally performed. An address of the defect area is moved to the alternative area.

A state of which the alternative area has been used is stored as a defect list in a predetermined area. The defect list is used in a lower hierarchical level such as a drive control section of the recording and reproducing apparatus and the system control section. In other words, in the lower hierarchical level such as the drive control section and the system control section, when the record medium is accessed, the defect list is referenced. Thus, even if the alternative process has been performed, a proper area can be accessed. With a mechanism of the alternative area, a high level application can record and reproduce data to and from the record medium without need to determine whether there is a defective record area on the record medium and detect a position of the defective record area.

When the record medium is a disc-shaped record medium, the alternative area may be allocated on the innermost or outermost periphery of the disc. When the rotation of the disc is controlled by a method called the zone control of which a rotation speed is gradually changed in a radius direction of the disc, each zone may have an alternative area. When the record medium is not a disc-shaped record medium such as a semiconductor memory, the alternative area may be allocated to an area whose physical address is the minimum or maximum.

In an application that handles AV data, a block of data that need to be successively and synchronously reproduced, namely data that need to be reproduced in real time, is referred to as a clip. For example, a block of data generated after a photographing operation of a video camera is started until it is stopped is a clip. Entity of a clip is composed of a single file or a plurality of files. According to this embodiment of the present invention, a clip is composed of a plurality of files. Details of a clip will be described later.

An NRT (Non Real Time) area for files other than a clip is allocated for example at the top of the logical address space. The NRT area is followed by clips. Clips are allocated free of positions of defects on the optical disc 100 so that the alternative process is not performed. A header (H) and a footer (F) are added to each clip. In this example, a header and a footer of a clip are together allocated after the clip.

In the following description, a first clip recorded on the optical disc 100 is referred to as clip #1, followed by clip #2, clip #3, and so forth where clip numbers are incremented one by one.

In the logical address space, an area in which data have not been recoded and an area in which data have been recorded and that is not necessary are managed as non-used areas in the file system FS. A record area is allocated to a file that is newly recorded corresponding to the non-used areas. Management information of the file is added to the file system FS.

When a recordable optical disc is used as the record medium, according to this embodiment of the present invention, clips are recorded in an annual ring structure on the record medium. Next, with reference to FIG. 2A to FIG. 2D and FIG. 3, the annual ring structure will be described. FIG. 2A shows that one clip 20 is allocated on a time line. In this example, the clip 20 is composed of seven files of video data 21, audio data 22A to 22D, sub AV data 23, and real time meta data 24.

The video data 21 are video data of which base band video data have been compression-encoded at a high bit rate according to for example the MPEG2 (Moving Pictures Experts Group 2) system. The audio data 22A, 22B, 22C, and 22D are base band audio data each of which has two channels. Instead, the audio data 22A, 22B, 22C, and 22D may be audio data of which base band audio data have been compression-encoded at a high bit rate. The video data 21 and the audio data 22A to 22D are data that are broadcast and edited. These data are referred to as main data.

According to this embodiment of the present invention, as main AV video data, video data having a bit rate of 50 Mbps (megabits per second) (this type of data is referred to as HD (High Definition) format)) and/or video data having a bit rate of 25 Mbps (this type of data is referred to as SD (Standard Definition) format)) are used.

The sub AV data 23 are data of which base band video data and audio data have been compression-encoded according to for example the MPEG4 system and multiplexed at a lower bit rate than the main video data and audio data. The sub AV data 23 are generated by compression-encoding the main AV data so that their bit rate is decreased to several Mbps (Megabits per second). The sub AV data 23 are data used instead of the main data when an edit point or the like is decided. The sub AV data 23 are also referred to as proxy data. According to this embodiment of the present invention, the number of channels of audio data of the sub AV data is fixed to eight.

The meta data are high level data of particular data and function as an index that represents the contents of various types of data. The meta data are categorized as two types that are real time meta data 24 generated along a time series of the main AV data and non-real time meta data generated in predetermined regions such as scenes of the main AV data. The non-real time meta data are recorded for example in the NRT area described in FIG. 1.

As shown in FIG. 2B, the clip 20 is divided corresponding to a predetermined reproduction period and recorded in the annual ring structure on the optical disc. As exemplified in FIG. 2C, one annual ring is divided by a unit of a predetermined reproduction period corresponding to a data size larger than one circular track. The video data 21, the audio data 22A to 22D, the sub AV data 23, and the real time meta data (RM) 24 are allocated to the divided time units so that these data synchronize with each other. In other words, these data that compose the clip 20 are interleaved in a predetermined time unit in the annual ring structure and recorded on the optical disc.

Data that form an annual ring are referred to as annual ring data. Annual ring data have a data amount that is a multiple of the minimum record unit of the disc. An annual ring is recoded so that its boundary matches a boundary of a block of a record unit of the disc.

FIG. 3 shows an example of annual ring data formed on the optical disc 100. In the example shown in FIG. 3, sub AV annual ring data #1, real time meta annual ring data #1, audio annual ring data # of each of channels, and video annual ring data #1 are recorded successively from the innermost periphery of the optical disc 100. Annual ring data are handled in this cycle. Formed on the outer periphery side of the video annual ring data #1 is a part of annual ring data of the next cycle as sub AV annual ring data #2.

The example in FIG. 3 shows that a reproduction time zone of one annual ring of the real time meta annual ring data corresponds to a reproduction time zone of one annual ring of the sub AV annual ring data and that a reproduction time zone of one annual ring of the real time meta annual ring data corresponds to a reproduction time zone of two annual rings of audio annual ring data. Likewise, a reproduction time zone of one annual ring of the real time meta annual ring data corresponds to a reproduction time zone of four annual rings of video annual ring data. The relationship between a reproduction time zone and the number of annual rings is set corresponding to for example a data rate of each type of data. In the following description, it is assumed that the reproduction period of data of one annual ring is 2 seconds.

As shown in FIG. 2D, headers and clips of clips are recorded in the annual ring structure.

Figure 4A:
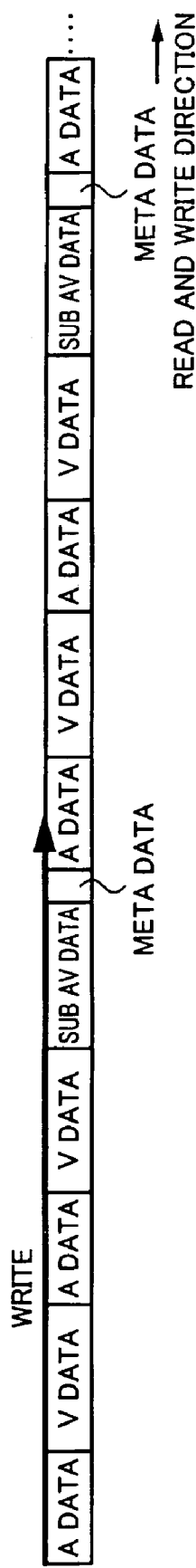
FIG. 4A and FIG. 4B are schematic diagrams showing an example of data that are read and written from and to an optical disc on which annual rings have been formed.
Figure 4B:
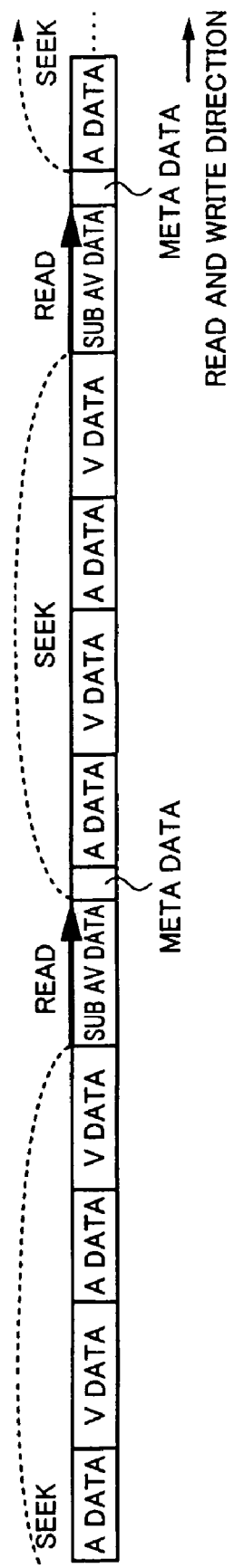

FIG. 4A and FIG. 4B show an example of which data are read and written from and to the optical disc 100 having annual rings as shown in FIG. 3. When the optical disc 100 has a large and successive blank and non-defect area, as exemplified in FIG. 4A, audio annual ring data, video annual ring data, sub AV annual ring data, and real time meta annual ring data generated from data series of audio data, video data, sub AV data, and real time meta data corresponding to a reproduction time zone are written to the blank area of the optical disc 100 as if they were written in a single stroke so that a boundary of each type of data matches a boundary of each sector of the optical disc 100. Data are read from the optical disc 100 in the same manner as they are written thereto.

On the other hand, when a particular data series is read from the optical disc 100, a record position of the data series is sought and the data are read therefrom. This operation is repeated. FIG. 4B shows a state of which an sub AV data series is selectively read. With reference to also FIG. 3, after the sub AV annual ring data #1 have been read, the real time meta annual ring data #1, the audio annual ring data 3, the video annual ring data #3, the audio annual ring data #4, and the video annual ring data #4 (not shown) are skipped and the sub AV annual data #2 of the next cycle are read.

In such a manner, data are recorded on the optical disc 100 in a unit of a reproduction period as cyclic annual ring data corresponding to a reproduction time zone. Thus, since audio annual ring data and video annual ring data of the same reproduction time zone are closely allocated on the optical disc 100, audio data and video data corresponding thereto can be quickly read and reproduced from the optical disc 100. In addition, since data are recorded so that a boundary of an annual ring matches a boundary of a sector, only audio data or video data can be read from the optical disc 100. As a result, only audio data or video data can be quickly edited.

In addition, as described above, each of the audio annual ring data, video annual ring data, sub AV annual ring data, and real time meta annual ring data has a data amount that is a multiple of a data amount of a sector of the optical disc 100. In addition, data are recorded so that a boundary of annual ring data matches a boundary of a sector. Thus, when only one of audio annual ring data, video annual ring data, sub AV annual ring data, and real time meta annual ring data is needed, it can be read without other types of data.

To conveniently use data allocation of annual rings, data need to be recorded on the optical disc 100 so that continuity of annual rings is assured. Next, with reference to FIG. 5A to FIG. 5C, this operation will be described. Now, it is assumed that only sub annual ring data (denoted by "LR" in FIG. 5A to FIG. 5C) are read.

When data are recorded, if a sufficient blank area has been allocated, a plurality of annual rings can be successively recorded. In this case, as shown in FIG. 5A, sub AV annual ring data that are chronologically successive can be read by the minimum number of track jumps. In other words, after the sub AV annual ring data are read, sub AV annual ring data of the next cycle can be read. As a result, the distance for which the pickup jumps becomes the shortest.

In contrast, when data are recorded, if a successive blank area has not been allocated, chronologically successive sub AV data are recorded in different areas of the optical disc 100. In this case, as exemplified in FIG. 5B, after first sub AV annual ring data are read, the pickup needs to jump a distance for a plurality of cycles of annual rings and read the next sub AV annual ring data. Since this operation is repeated, the read speed for the sub AV annual ring data decreases in comparison with the case shown in FIG. 5A. In addition, as exemplified in FIG. 5C, non-edited AV data (AV clip) may not be quickly reproduced.

To assure continuity of annual rings, according to this embodiment of the present invention, an allocation unit that has a plurality of annual rings is defined. When data are recorded to annual rings, a successive blank area that is larger than the allocation unit length is allocated.

Figure 6A:
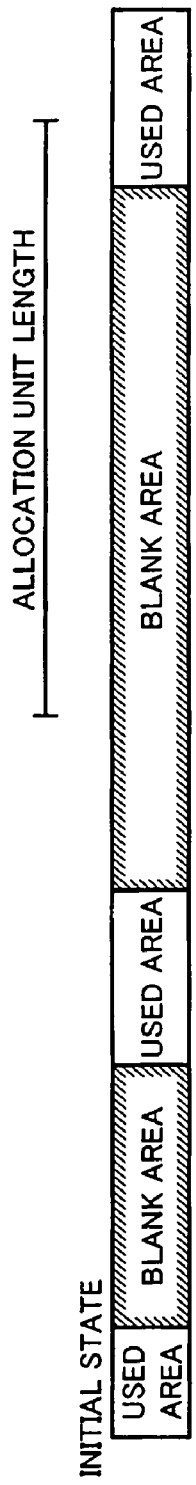
FIG. 6A, FIG. 6B, FIG. 6C, and FIG. 6D are schematic diagrams describing an allocation unit.
Figure 6B:
Figure 6C:
Figure 6D:

Next, with reference to FIG. 6A to FIG. 6D, this operation will be specifically described. The allocation unit length is pre-set. The allocation unit length is set to a multiple of a total reproduction period of each type of data recorded in one annual ring. When the reproduction period of one annual ring is 2 seconds, the allocation unit length is set to 10 seconds. The allocation unit length is used as a ruler with which the length of a blank area of the optical disc 100 is measured (see an upper right portion of FIG. 6A). As shown in FIG. 6A, it is assumed that there are three used areas that are not successive on the optical disc 100 and that blank areas are sandwiched by used areas.

When AV data having a predetermined length and sub AV data corresponding to the AV data are recorded on the optical disc 100, the allocation unit length and the length of the blank area are compared. A blank area that has a length larger than the allocation unit length is allocated as a reserved area (see FIG. 6B). In the example shown in FIG. 6A, a right blank area of the two blank areas is larger than the allocation unit length and allocated as a reserved area. Annual ring data are successively and continuously recorded from the beginning of the reserved area (see FIG. 6C). In this manner, the annual ring data are recorded. When the length of the blank area of the reserved area is smaller than one annual ring of the annual ring data (see FIG. 6D), the reserved area is deallocated. As shown in FIG. 6A, the allocation unit length is applied to another blank area of the optical disc 100 to look for a reserved area.

Since a blank area for a plurality of annual rings is sought and the annual rings are recorded in the blank area, continuity of annual rings is assured to some extent. As a result, annual ring data can be smoothly reproduced. In the foregoing example, the allocation unit length is 10 seconds. However, the allocation unit length is not limited to 10 seconds. Instead, a length larger than this reproduction period can be set as the allocation unit length. Specifically, it is preferred that the allocation unit length be set in the range from 10 seconds to 30 seconds.

Figure 7:
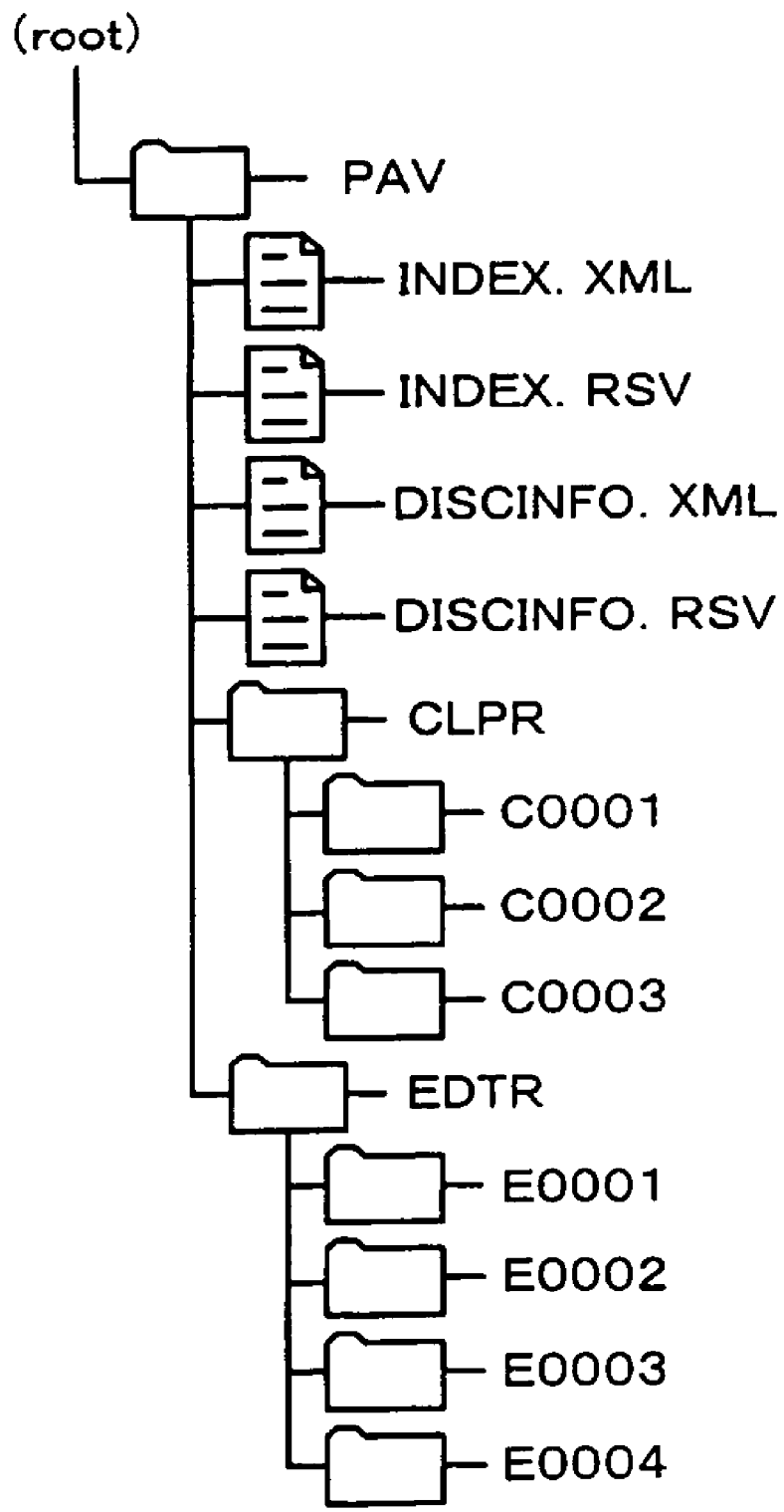
FIG. 7 is a schematic diagram showing a management structure of data according to an embodiment of the present invention.

Next, with reference to FIG. 7, FIG. 8, and FIG. 9, a management structure of data according to an embodiment of the present invention will be described. According to this embodiment of the present invention, data are managed in a directory structure by a file system. As exemplified in FIG. 7, a directory PAV is disposed immediately under a root directory (root). According to this embodiment, directories under the directory PAV are defined as follows.

Audio data and video data of a plurality of types of signals coexistively recorded on one disc are defined under the directory PAV. Any data can be recorded in the directory PAV for which a data management according to this embodiment of the present invention is not performed.

Disposed immediately under the directory PAV are four files (INDEX.XML, INDEX.BUP, DISCINFO.XML, and DISCINFO.BUP) and two directories (CLPR and EDTR).

The directory CLPR manages clip data. A clip is a block of data generated after a photographing operation is started until it is stopped. For example, when a video camera is operated, one clip is a block of data generated after an operation start button thereof is pressed until an operation stop button thereof is pressed (the operation start button is released).

One block of data is composed of main audio data and video data, sub AV data generated from the audio data and video data, and real time meta data and non-real time meta data corresponding to the audio data and video data as described above. In each of directories "C0001," "C0002," and so forth disposed immediate under the directory CLPR, a block of data that composes a clip is stored.

Figure 8:
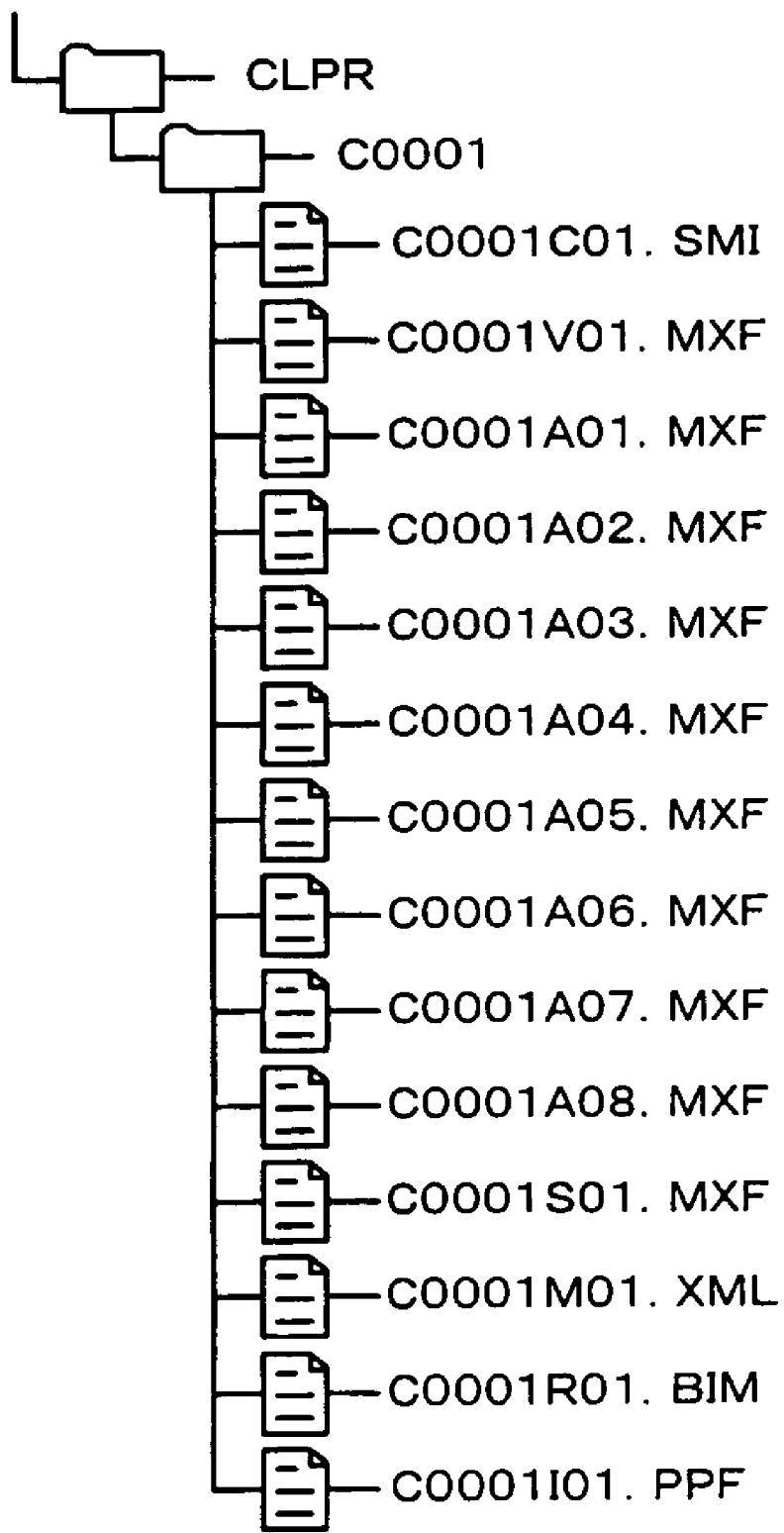
FIG. 8 is a schematic diagram showing a management structure of data according to an embodiment of the present invention.

FIG. 8 shows an example of a structure of the directory "C0001" corresponding to one clip "C0001." Hereinafter, a directory corresponding to one clip immediately under the directory CLPR is referred to as a clip directory. In the clip directory "C0001," the foregoing types of data are identified by file names and stored. In the example shown in FIG. 8, a file name is composed of 12 digits. First five digits of eight digits followed by a delimiter are used to identify a clip. Three digits immediately followed by the delimiter are used to identify a type of data such as audio data, video data, or sub AV data. Three digits immediately preceded by the delimiter are an extension that represents a format of data.

Specifically, in the example shown in FIG. 8, as files a block that composes the clip "C0001," a clip information file "C0001C01.SMI" that represents clip information, a main video data file "C0001V01.MXF," main audio data files "C0001A01.MXF" to "C0001A08.MXF" of eight channels, a sub AV data file "C0001S01.MXF," a non-real time meta data file "C0001M01.MML," a real time meta data file "C0001R01.BIM," and a pointer information (picture pointer) file "C0001I01.PPN" are stored in the clip directory "C0001."

According to this embodiment of the present invention, a plurality of types of data signals can coexistively stored in clip directories under the directory CLPR. For example, with respect to signals of main video data, a single GOP, 50 Mbps video data is stored in the clip directory "C0001," whereas long GOP, 25 Mbps video data is stored in the clip directory "C0002." On the other hand, in a clip directory, a plurality of types of data signals of each type of data cannot be coexistively stored. A file of which video data are recorded from the beginning to a particular point at 50 Mbps and from the particular point to the end at 25 Mbps cannot be stored in a clip directory.

With respect to single GOP data, each frame is composed of an I picture and a relationship of 1 GOP=1 frame is satisfied. Each frame can be edited in high quality. With respect to long GOP data, each frame is composed of an I picture, a P picture, and a B picture and one GOP is composed of a plurality of frames that end with an I picture. The long GOP data may have no B picture.

Returning to FIG. 7, the directory EDTR manages edit information. According to this embodiment of the present invention, an edit result is recorded as an edit list and a play list. Disposed immediately under the directory EDTR are directories "E0001," "E0002," and so forth each of which stores a block of data that composes an edit result.

An edit list is a list that describes edit points (IN point, OUT point, and so forth) of a clip, a reproduction order, and so forth. An edit list is composed of a non-destructive edit result of a clip and a play list that will be described later. When the non-destructive edit result of the edit list is reproduced, files stored in the clip directory are referenced corresponding to the list. Reproduced pictures are successively obtained from a plurality of clips as if one edited stream were reproduced. However, in the non-destructive edit result, files are referenced from the list regardless of locations of files on the optical disc 100. Thus, continuity of reproduced data is not assured.

When the edit result shows that it is difficult to successively reproduce files and parts thereof referenced by a play list, the files and parts thereof are reallocated to a predetermined area on the optical disc 100. As a result, continuity of data is assured when an edit list is reproduced.

When management information (for example, an index file "INDEX.XML" that will be described later) for files to be edited is referenced corresponding to a result of an edit list created by an edit operation, it is estimated whether files can be non-destructively reproduced corresponding to the edit operation, namely the files stored in clip directories can be successively reproduced corresponding to the edit result. When the result shows that the files can be successively reproduced, these files are copied to a predetermined area of the optical disc 100. The files reallocated to the predetermined area are referred to as bridge essence files. A list of which an edit result is affected to bridge essence files is referred to as a play list.

If an edit result complicatedly references clips, when one clip is changed to another clip, the pickup may not be able to seek the other clip in time. In this case, a play list is created. Bridge essence files are recorded to a predetermined area of the optical disc 100.

Figure 9:
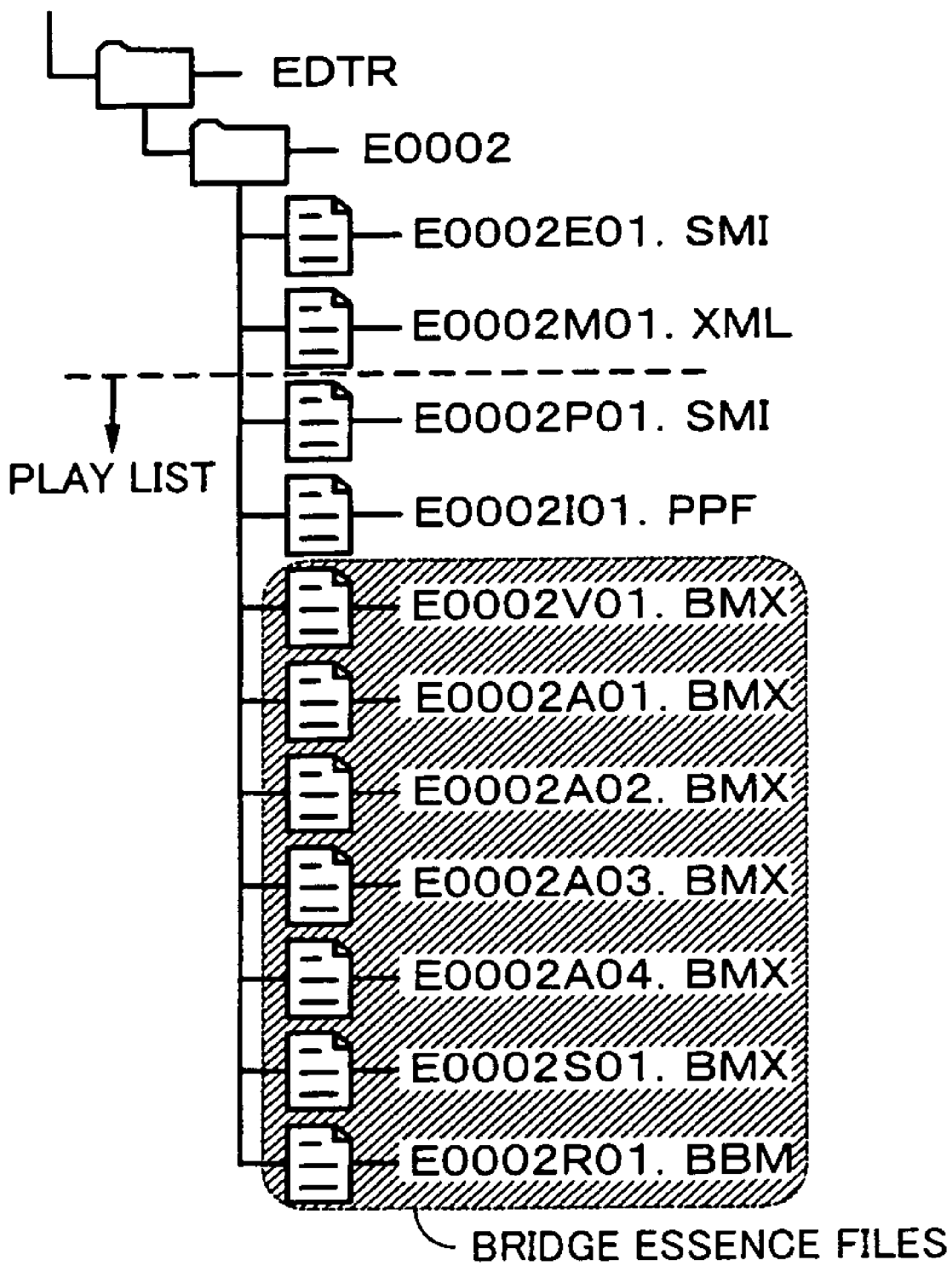
FIG. 9 is a schematic diagram showing a management structure of data according to an embodiment of the present invention.

FIG. 9 shows an example of a structure of a directory "E0002" corresponding to one edit result "E0002" disposed immediately under the directory EDTR. A directory corresponding to one edit result immediately under the directory EDTR is referred to as an edit directory. Data generated as the edit result are identified by file names and stored in the edit directory "E0002." A file name is composed of 12 digits. First five digits of eight digits followed by a delimiter "." are used to identify an edit operation. The remaining three digits of the eight digits are used to identify a type of data. Three digits preceded by the delimiter are an extension that identifies a format of data.

More specifically, in the example shown in FIG. 9, as files that compose the edit result "E0002," an edit list file "E0002E01.SMI," a file "E0002M01.XML" that describes information of real time and non-real time meta data, a play list file "E0002P01.SMI," bridge essence files "E0002V01.BMX" and "E0002A01.BMX" to "E0002A04.MBX" of main data, a bridge essence file "E0002S01.BMX" of sub AV data, and a bridge essence file "E0002R01.BMX" of real time and non-real time meta data are stored in the edit directory "E0002."

Shaded files of files stored in the edit directory "E0002," namely the bridge essence files "E0002V01.BMX" and "E002A01.BMX" to "E0002A04.BMX," the bridge essence file "E0002S01.BMX" of sub AV data, and the bridge essence file "E0002R01.BMX" of real time and non-real time meta data are files that belong to the play list.

As described above, for example video data stored in a clip directory are referenced corresponding to an edit list. Since different types of data signals can be coexistently stored in different clip directories, different types of data signals can be coexistently contained in an edit list.

Returning to FIG. 7, the file "INDEX.XML" is an index file that manages material information stored in directories under the directory PAV. In this example, the file "INDEX.XML" is described in XML (Extensible Markup Language) format. The file "INDEX.XML" manages each of the foregoing clips and edit lists. The file "INDEX.XML" manages for example a conversion table for file names and UMIDs, duration information, a reproduction order of each material reproduced from the optical disc 100, and so forth. In addition, the file "INDEX.XML" manages video data, audio data, sub AV data, and so forth that belong to each clip. Moreover, the file "INDEX.XML" manages clip information for files in a clip directory.

The disc information file "DISCINFO.XML" manages information about the disc. The file "DISCINFO.XML" also stores reproduction position information and so forth.

When the optical disc 100 is loaded into the drive device and data are recorded and reproduced to and from the optical disc 100, it is necessary to perform a mount process that connects a file system of the optical disc 100 to the drive device and an application system with respect to software. When the mount process is performed, the file system FS area of the optical disc 100 is read by the system. In addition, when the optical disc 100 is loaded into the drive device, the index file "INDEX.XML," the backup file "INDEX.BUP" of the index file, the disc information file "DISCINFO.XML," the backup file "DISCINFO.BUP" of the disc information file, a disc meta file (not shown), a clip information file "CxxxxC01.SMI," a non-real time meta data file "CxxxM01.XML" about a clip, a picture pointer file "CxxxxI01.PPN," an edit list file "ExxxxE01.SMI," and a non-real time meta data file "ExxxxM01.XML" about an edit list of files managed in the management structure are read by the system.

When the mount process is performed, for each type of data, one of the index file and the backup file of the index file and one of the disc information file and the backup file of the disc information file are read. Only one disc meta data file is read. When the mount process is performed, all non-real time meta data files about clips and picture pointer files are read from the optical disc 100.

A data size of each of these files read in the mount process is for example several kB that is smaller than a data size of one RUB.

Figure 10:
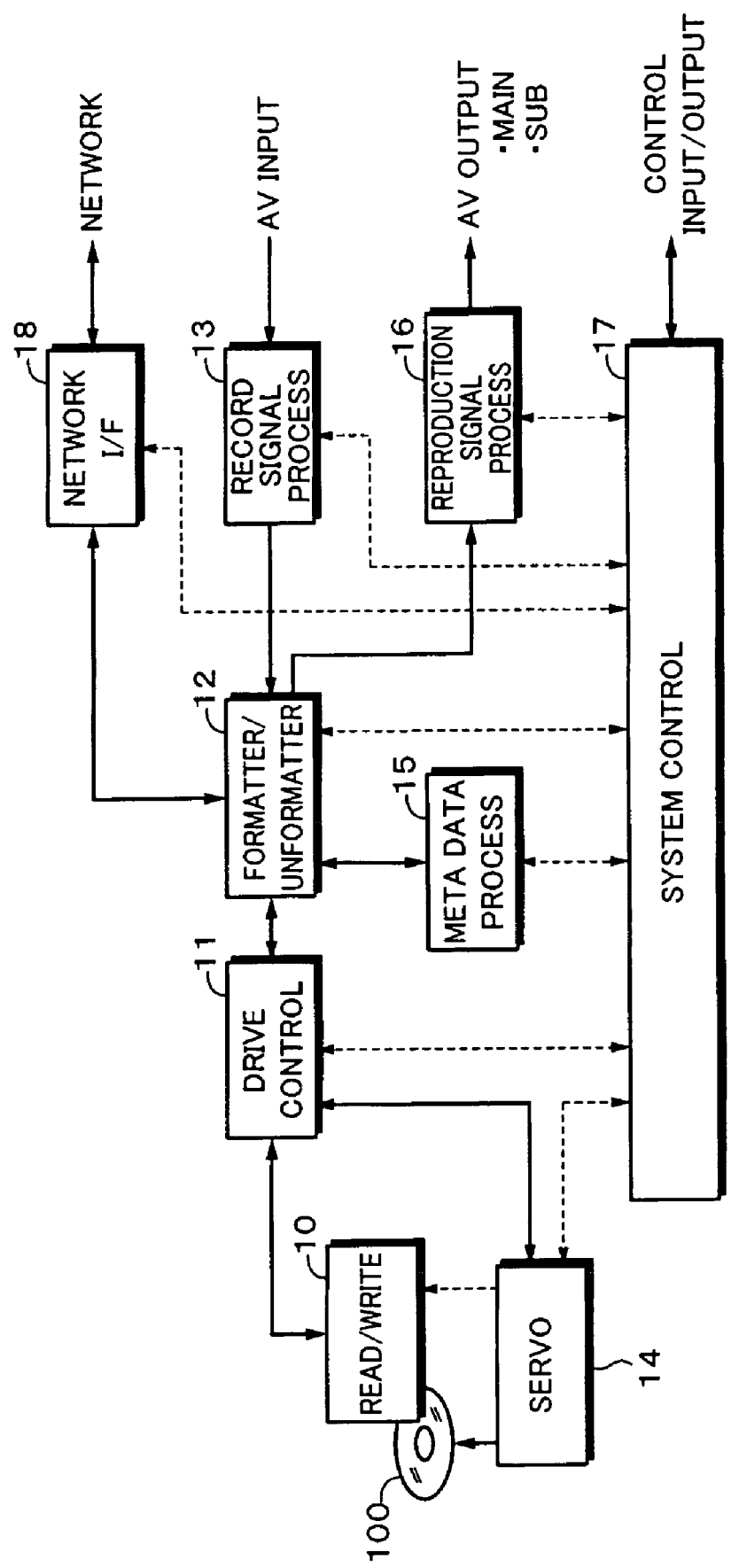
FIG. 10 is a block diagram showing an example of a structure of a recording and reproducing apparatus according to an embodiment of the present invention.

FIG. 10 is a schematic diagram showing an example of a structure of a recording and reproducing apparatus according to an embodiment of the present invention. This recording and reproducing apparatus is connected to for example a video camera. The recording and reproducing apparatus processes AV data photographed by the video camera and records the processed AV data as signals to the optical disc 100. In addition, the recording and reproducing apparatus reproduces AV data from the optical disc 100, processes the AV data, and outputs the processed AV data as signals. Moreover, the recording and reproducing apparatus can perform an edit process for AV data recorded on the optical disc 100 according to a command input from a control panel associated with the apparatus, an input device connected thereto through an RS-422 interface (not shown), or the like.

A system control section 17 has one or a plurality of CPUs (Central Processing Units), a ROM (Read Only Memory) that pre-stores a program and data, a RAM (Random Access Memory) used as a work memory of the CPU, and so forth. The system control section 17 controls the whole recording and reproducing apparatus according to a control signal that is input from a control input/output terminal and a program that is read from the ROM. The system control section 17 executes a program in a file system layer and controls data write/read operations for the optical disc 100 corresponding to information of the file system FS of the optical disc 100. Connected to the control input/outer terminal are for example the foregoing control panel and input device.

Next, a structure of a recording system will be described. A record operation command is sent from the control input/output terminal to the system control section 17. Corresponding to the record operation command, the system control section 17 issues a command to each section of the recording and reproducing apparatus so as to start the record operation.

Base band AV data to be recorded are supplied from for example a video camera or an external device to a record signal process section 13. The record signal process section 13 performs a predetermined signal process and a compression encoding process for the input base band AV data and generates main AV data and sub AV data to be recorded.

For example, the record signal process section 13 processes base band video data according to the MPEG2 system so that one GOP (Group Of Picture) is composed of a plurality of frames that are at least one I picture and a plurality of P pictures. In addition, the record signal process section 13 compression-encodes the base band video data so that a predetermined bit rate is obtained. The record signal process section 13 does not compression-encode audio data, but uses PCM (Pulse Code Modulation) data as main audio data.

In addition, the record signal process section 13 compression-encodes the base band video data and audio data according to for example MPEG4 system so that a bit rate of several Mbps is obtained. As a result, the record signal process section 13 generates sub AV data. With respect to video data, the record signal process section 13 encodes sub AV data in a unit of a predetermined number of frames. According to this embodiment of the present invention, the record signal process section 13 forms one GOV (Group Of Video Object Plane) of video data of sub AV data with 10 frames of one I picture and nine P pictures.

The record signal process section 13 instantaneously compresses main audio data in combination of sampling frequency conversion of which the main audio data is compressed in for example chronological axis direction and a logarithmic compression of which a word length is compressed to generate audio data of sub AV data. The record signal process section 13 performs the sampling frequency conversion by down-sampling main audio data having a sampling frequency of for example 48 kHz into audio data having a sampling frequency of 8 kHz. The record signal process section 13 performs the word length compression according to A-Law system of which when data have a small amplitude, the quantizing step is decreased and when data have a large amplitude, the quantizing step is increased. Before the record signal process section 13 compression-encodes data, when a bandwidth of main audio data is limited by a low pass filter, deterioration of audio quality can be minimized. According to this embodiment of the present invention, the low pass filter is a 512-tap FIR (Finite Impulse Response) filter.

The main AV data and sub AV data that are output from the record signal process section 13 are supplied to a formatter/unformatter section 12. The main AV data and sub AV data that are output from the record signal process section 13 and real time meta data that are output from a meta data process section 15 that will be described later compose a clip.

The meta data process section 15 generates real time meta data recorded on the optical disc 100 along with main AV data and sub AV data and data (header and footer) with which a clip is allocated in a predetermined format under the control of the system control section 17. The meta data process section 15 also generates non-real time meta data. These types of data generated by the meta data process section 15 are supplied to the formatter/unformatter section 12.

The formatter/unformatter section 12 allocates individual types of data supplied from the record signal process section 13 and the meta data process section 15 in the foregoing annual ring structure. The formatter/unformatter section 12 has for example a memory that stores the individual types of data at addresses in the annual ring structure. The formatter/unformatter section 12 performs a read control so that data are read in an unit of an annual ring from the memory. Clips allocated in the annual ring structure are supplied to a drive control section 11 in an unit of a annual ring.

In addition, the formatter/unformatter section 12 performs an allocation process for non-real time meta data supplied from the meta data process section 15 in the annual ring structure. Although details will be described later, files are allocated so that when a mount process of the optical disc 100 is performed, non-real time meta data files are successively read from a pair of an odd number clip and an even number clip in a unit of an RUB.

The drive control section 11 has a buffer memory to and from which data can be written and read in a unit of for example one RUB. The supplied data are temporarily stored in the buffer memory and then recorded on the optical disc 100 in a unit of one RUB. In other words, this buffer memory coordinates a transfer rate of data with a record/reproduction speed and temporarily stores record data and so forth to be cached.

In addition, when data are recorded, the drive control section 11 performs a predetermined record signal process for supplied data. Moreover, the drive control section 11 controls a read/write section 10 and a servo control section 14 that will be described later corresponding to signals supplied therefrom so as to write record data at a predetermined address of the optical disc 100. For example, the drive control section 11 designates the next write position with a write pointer in a unit of one RUB of the optical disc 100 to control the write position.

The drive control section 11 encodes main AV data, sub AV data, real time meta data, non-real time meta data, header, and footer supplied from the formatter/unformatter section 12 with an error correction code in a unit of an ECC (Error Correction Coding) block having a predetermined size. Data encoded with an error correction code are record-encoded in a predetermined manner and supplied as a record signal to the read/write section 10.

The read/write section 10 has an optical pickup composed of for example a laser diode and a laser drive circuit that controls a laser power of the optical pickup corresponding to a record/reproduction operation mode. The read/write section 10 has a thread drive section that controls a position of the optical pickup in a radius direction of the optical disc 100 corresponding to a thread control signal supplied from the servo control section 14. The servo control section 14 controls the thread drive portion and a spindle motor (not shown) that rotates and drives the optical disc 100 corresponding to control signals supplied from the drive control section 11 and the system control section 17.

The read/write section 10 drives the optical pickup corresponding to a record signal supplied from the drive control section 11 and records data corresponding to the record signal to the optical disc 100. The system control section 17 and the drive control section 11 designate a record position with information that represents a used area state of the optical disc 100 corresponding to information of the file system FS that is pre-read from the optical disc 100 before the record operation and a command that is input from the control input/output terminal.

According to this embodiment of the present invention, the record operation is successively performed in a unit of one annual ring. In addition, according to this embodiment of the present invention, a block size of the minimum record unit of the optical disc 100 is the same as a size of one ECC block. Data are recorded so that the minimum record unit of the optical disc 100 matches an ECC block. In other words, according to this embodiment of the present invention, an ECC block is a unit of the record signal process and a unit of the record signal process. In addition, an ECC block is a block of a data read/write unit of the optical disc 100.

In each annual ring, a marker block composed of a predetermined data sequence of one to several ECC blocks is recorded. When data for one annual ring are being recoded, if a record error or the like takes place, this marker block is used to allow record data of annual rings immediately followed by the error annual ring to be reproduced. Thus, whenever data for one annual ring have been recorded, the marker block of the annual ring becomes unnecessary.

Next, a structure of a reproduction system will be described. A reproduction operation command is issued from the control input/output terminal to the system control section 17. Corresponding to the reproduction operation command, the system control section 17 causes each section of the recording and reproducing apparatus to start the reproduction operation. Corresponding to the command, the read/write section 10 is controlled in a predetermined manner. The read/write section 10 reads data from a designated address of the optical disc 100 in a record unit. The read/write section 10 supplies a reproduction signal that is read from the optical disc 100 to the drive control section 11.

The drive control section 11 decodes a record code of the supplied reproduction signal, obtains reproduction data, and decodes the reproduction data with an error correction code. The error corrected reproduction data are supplied to the formatter/unformatter section 12. The formatter/unformatter section 12 separates the supplied reproduction data into individual types of data for example main AV data, sub AV data, and real time data. The supplied reproduction data are stored in for example the memory of the formatter/unformatter section 12. When the reproduction data are stored for one annual ring in the memory, each type of data that compose the annual ring is read and supplied to process sections corresponding to the types of the data. The main AV data and the sub AV data are supplied to a reproduction signal process section 16. The real time meta data are supplied to the meta data process section 15.

The meta data process section 15 interprets the supplied real time meta data and supplies the interpreted information to the system control section 17.

The reproduction signal process section 16 performs predetermined signal processes for the supplied main AV data and the sub AV data. The reproduction signal process section 16 decodes each or one of the main AV data and the sub AV data. The reproduction signal process section 16 may directly output the main AV data and sub AV data without decoding them. The sub AV data are decoded in a unit of one GOV because one GOV is composed of 10 frames. The audio data are instantaneously decompressed according to the A-Law system. The down-sampled audio data are up-sampled at 48 kHz. When audio data are up-sampled, a 512-tap FIR filter that is the same as that used in the record process is used as a low pass filter to minimize deterioration of audio quality.

A network interface (I/F) 18 is connected to a network for example the Internet or a LAN (Local Area Network). The network I/F 18 controls communication through the network. The recording and reproducing apparatus receives AV data through the network and records the AV data on the optical disc 100.

AV data transmitted through the network and received by the network I/F 18 are supplied to the formatter/unformatter section 12. In this case, the AV data may be supplied from the network I/F 18 to the record signal process section 13. Instead, the AV data may be directly supplied from the network I/F 18 to the drive control section 11. When the network I/F 18 receives the AV data, the system control section 17 determines a format of the received AV data and performs a record signal process, a process of the formatter/unformatter section 12, a meta data process, and so forth when necessary. AV data that have been processed are supplied to the drive control section 11. The drive control section 11 performs a predetermined process the AV data and then records the processed AV data to the optical disc 100.

AV data and sub AV data read from the optical disc 100 may be supplied to the network I/F 18 through the formatter/unformatter section 12 and transmitted to the network. In this case, since the sub AV data have been compression-encoded at a low bit rate, it is suitable to be transmitted through the network.

Next, a write process for non-real time meta data to the optical disc 100 according to an embodiment of the present invention will be described. FIG. 11A, FIG. 11B, FIG. 11C, and FIG. 12 show the write process for non-real time meta data in an SD format. In this example, an index file (denoted by "I" in these drawings), a backup file thereof (denoted by "B" in these drawings), a clip information file (denoted by "C" in these drawings), and a non-real time meta data file about a clip (this file is denoted by "M" in these drawings) that are written to the optical disc 100 will be described.

The file system is capable of managing a file in a unit of 2 kB. In contrast, the minimum record unit of the optical disc 100 is 64 kB. As outlined in FIG. 1, the non-real time meta data are written in the NRT area in the logical address space of the optical disc 100 corresponding to each clip.

As exemplified in FIG. 11A, for a clip #1, an index file I, a backup file B thereof (hereinafter this file is referred to as a backup file B), a clip information file C, and a non-real time meta data file M about the clip are successively written for example in each RUB.

As exemplified in FIG. 11B, for a clip #2 preceded by the clip #1, unlike the clip #1, a non-real time meta data file M about the clip, a clip information file C, an index file I, and a backup file B are successively written in each RUB.

When the clip #2 is written, information about the clip #2 is added to the index file I and the backup file B and recorded in the area of the clip #2. In addition, since the index file I and the backup file B written in the clip #1 are not necessary, they are erased. An operation that writes a changed file to a new record area and erases a former written file is referred to as cyclic recording.

As exemplified in FIG. 11C, for a clip #3 preceded by the clip #2, the order of recorded files is the same as that for the clip #1. In addition, information about the clip #3 is added to an index file I and a backup file B. The index file I and the backup file B recoded in the area of the clip #2 are erased.

Figure 12:
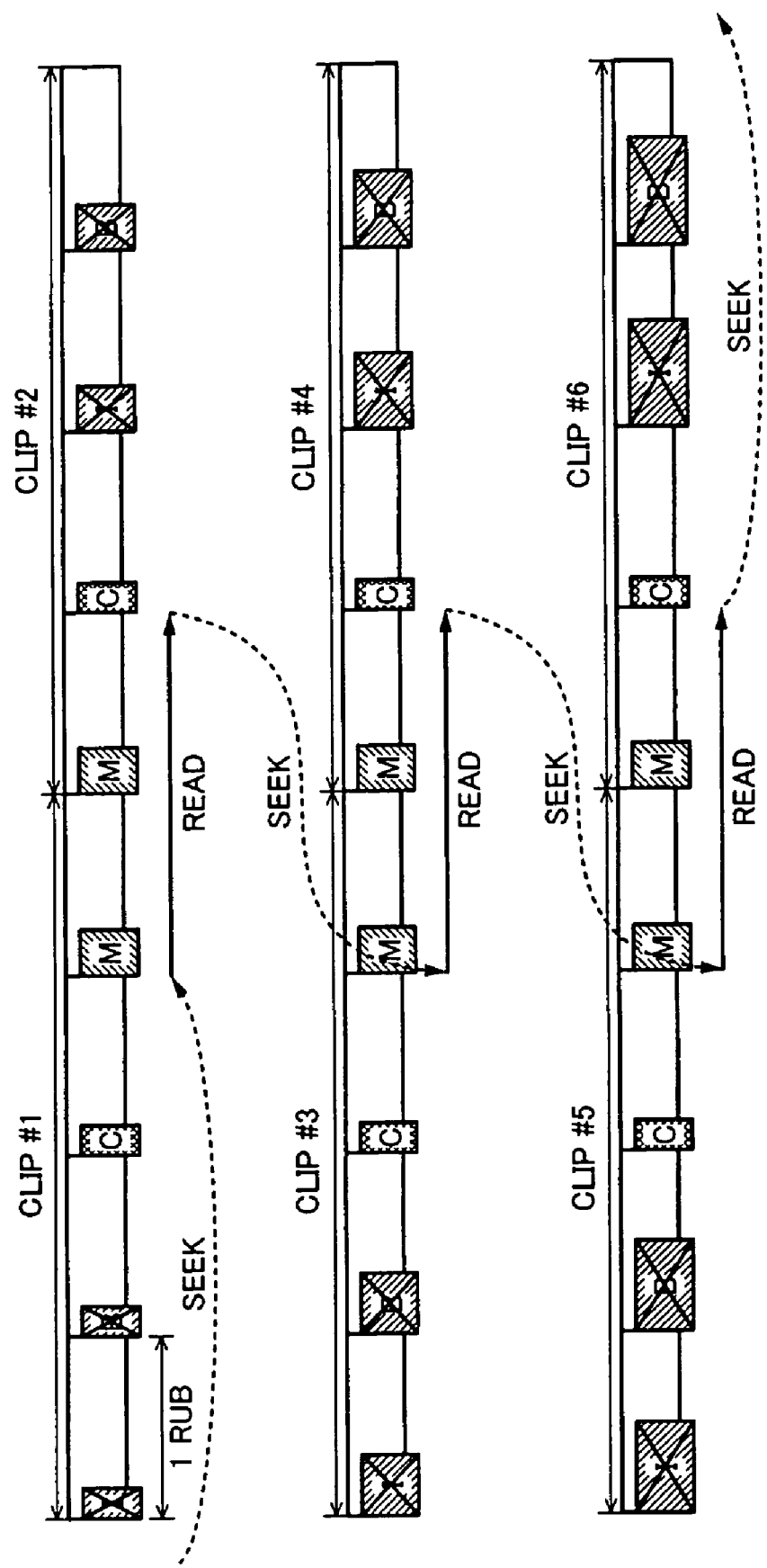
FIG. 12 is a schematic diagram showing an example of a write process of non-real time meta data in an SD format.

In such a manner, an odd number clip and an even number clip are paired and the order of files of the paired clips is changed. Thus, when the optical disc 100 is mounted, the number of times of the seek operation for reading non-real time meta data files about clips becomes small. As a result, the read speed increases. FIG. 12 shows this operation. As was described above, when the optical disc 100 is mounted, all non-real time meta data files M about clips on the optical disc 100 are read. Since the record order of non-real time meta data files M about clips is changed depending on whether a clip is an odd number clip or an even number clip. Thus, RUBs of non-real time meta data files M about clips are adjacent every two clips. Thus, when these two files are read, no seek operation occurs. As a result, the mount process can be quickly performed.

Next, with reference to FIG. 13 and FIG. 14, a write process for non-real time meta data in an HD format will be described. In the HD format, since data can be compression-encoded at a variable bit rate, a desired position can be accessed with a picture pointer file (denoted by "P" in these drawings).

The picture pointer is offset information of each frame position of a clip. According to the MPEG2, a variable bit rate at which a data compression rate is changed for each frame can be set. For example, a frame of a plane picture is compression-encoded at a high compression rate. A frame of a course picture is compression-encoded at a low compression rate. Thus, when the compression rate is changed corresponding to a characteristic of a frame, video data having a high resolution can be transmitted and recorded at a low bit rate. In addition, according to the MPEG2, data can be compression-encoded with a variable length code.

In video data compression-encoded at a variable bit rate, a position of a frame and a position of a GOP (Group Of Picture) composed of a plurality of frames vary. Thus, it is difficult to jump to a desired position. To allow video data compression-encoded at a variable length bit rate to be easily accessed, offset information of each frame position of each clip is tabulated as picture points and allocated as a non-real time meta data file. When the disc is loaded into the drive, these picture points are read. As a result, a desired position of a clip can be quickly accessed.

To read a picture pointer file P, there are two methods. In the first method, when the disc is mounted, all picture pointer files P recorded on the optical disc 100 are read. In the second method, when the optical disc 100 is mounted, the picture pointer files P are not read. Instead, when a clip is reproduced from the optical disc 100, a picture pointer file P corresponding to the reproduced clip is read.

In the second method, whenever a clip jump is performed, it is necessary to read a picture pointer file P corresponding to the clip. As was described with reference to FIG. 1, a non-real time meta data file is written to an NRT area on an inner periphery of the optical disc 100, the NRT area being different from an area for a clip. Thus, whenever a clip is accessed, if a picture pointer file P corresponding thereto is read, a corresponding NRT area needs to be accessed. Thus, the seek time becomes long. Occasionally, the clip may not be reproduced in time.

Figure 13:
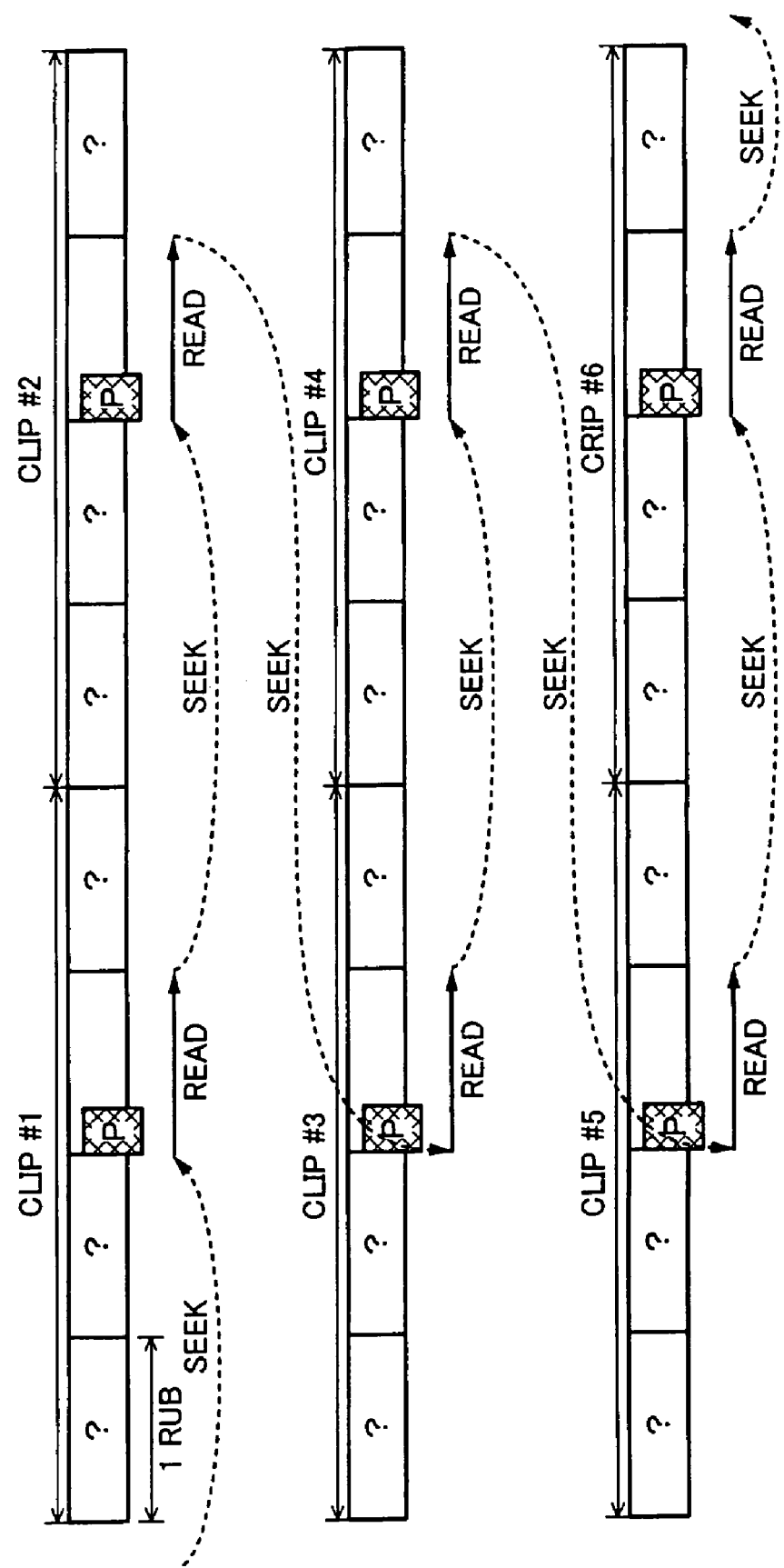
FIG. 13 is a schematic diagram showing an example of a write process of non-real time meta data in an HD format.

On the other hand, when or after the mount process is performed, if all picture pointer files P are read, as exemplified in FIG. 13, all clips recorded on the optical disc 100 are repeatedly sought. As a result, it takes a long read time.

Thus, the method described with reference to FIG. 11A to 11C and FIG. 12 is applied. As exemplified in FIG. 14, positions of a non-real time meta data file M about a clip and a picture pointer file P that are read when the disc is mounted are alternately changed depending on whether the clip is an odd number clip or an even number clip so that RUBs for these files are successive.

In the example shown in FIG. 14, for odd number clips (a clip #1, a clip #3, and a clip #5), an index file I, a backup file B, a clip information file C, a non-real time meta data file M about a clip, and a picture pointer file P are successively allocated and recorded in each RUB. In contrast, for even number clips (a clip #2, a clip #4, and a clip #6), positions of a non-real time meta data file M about a clip and a picture pointer file P are reversed and allocated and recorded in RUBs at the beginning of the area of the clip.

As described above, record positions of a non-real time meta data file M about a clip and a picture pointer file P are alternately reversed depending on whether the clip is an odd number clip or an even number clip. In addition, record positions of a non-real time meta data file M about a clip and a picture pointer file P and record positions of an index file I and a backup file B are alternately reversed depending on whether the clip is an odd number clip or an even number clip. Every two clips as a pair of an odd number clip and an even number clip, RUBs for non-real time meta data files M about the clips become adjacent. When these four files are read, no seek occurs. As a result, the mount process can be quickly performed.

Next, a method of more quickly reading a non-real time meta data file from a disc that is mounted will be described. In the foregoing example, one non-real time meta data file is written to one RUB. In contrast, when a plurality of non-real time meta data files are written to one RUB, since the number of RUBs to be read when the optical disc 100 is mounted decreases, it can be expected that the mount process is quickly performed.

For example, a plurality of files are written to one RUB under the control of the file system. Non-real time meta data files of clips are successively recorded to one RUB. When a total of a data size of non-real time meta data files of clips exceeds one RUB (64 kB in this example), data that exceeds one RUB are successively recorded to an adjacent RUB.

Such a process is performed with the foregoing cache function. For example, data are written to the buffer memory of the drive control section 11 in a management unit (2 kB) of the file system and data are read therefrom in an RUB unit (64 kB). With this buffer memory, data recorded to the optical disc 100 is cached. Data cached to the buffer memory in the management unit of the file system are read in the RUB unit and written to a corresponding RUB of the optical disc 100.

As a more specific example of the process, under the control of the file system, a clip information file C, a non-real time meta data file M about a clip, a picture pointer file P, and an index file I or a backup file B are cached and successively written to an area of an RUB corresponding to a write pointer in the buffer memory. When the total data size of these files exceeds the data size of the RUB, the data that exceed the size of the RUB are written to an area of the buffer memory corresponding to an adjacent RUB.

After data have been written to the cache, cached data are read and written to a corresponding RUB of the optical disc 100. Data that cannot be written to one RUB are written to an adjacent RUB. In reality, cached data are written to each RUB of the optical disc 100. In other words, even if a part of an area of an RUB has been cached, the cached contents of the area are written to the optical disc 100.

When a file managed in a data size smaller than the minimum record unit of a record medium is written thereto, the read modify write is used as was described in the related art section. Next, with reference to FIG. 15A, FIG. 15B, FIG. 15C, FIG. 16A, FIG. 16B, and FIG. 16C, an example of which the read modify write is applied to a file structure according to an embodiment of the present invention will be described.

FIG. 15A to FIG. 15C show an example of a record operation using the read modify write. As shown in FIG. 15A, clips that end with a clip #5 are recorded to a new disc. A part of a picture pointer file P200 as a non-real time meta data file is not written to an RUB 201 and the part that cannot be written to the RUB 201 is written to the next RUB 202. When this disc is loaded into the drive, the following operation is performed.

Since the part of the picture pointer file P200 that has not be written to the RUB 201 has been written to the RUB 201, the number of rewrite times of the RUB 202 is 1. Since data have not been written to RUBs preceded by the RUB 202, the number of rewrite times of these RUBs is 0.

When a clip #6 is recorded to the disc, corresponding non-real time meta data is written to an NRT area in a predetermined manner. At this point, each type of data written to the RUB 202 is cached and successively allocated to an area of the RUB 202 of the buffer memory. In other words, as shown in FIG. 15B, a part of a picture pointer file P written to the RUB 202 is stored in the area of the RUB 202 of the buffer memory. As shown in FIG. 15C, a picture pointer file P203 of the clip #6 is stored in the buffer memory so that the picture pointer file P203 is connected to the part of the picture pointer file P200A stored in the buffer memory.

Thereafter, non-real time meta data M204 about a clip as a non-real time meta data file of the clip #6 are stored in an area of the RUB 202 of the buffer memory so that the non-real time meta data M204 is connected to the picture pointer file P203 (FIG. 16A). Thereafter, a clip information file C205 is stored (FIG. 16B).

After the clip information file, an index file C205 is stored in the buffer memory (FIG. 16C). After the index file 1206 has been stored in the buffer memory, since an area of one RUB of the buffer memory is filled with data that have not been recorded, the data of the buffer memory are written to an RUB 202 of the disc. The cached data are synchronized with the record area (RUB 202) of the optical disc 100. A part 200A of the picture pointer file P has been written to the RUB 202 when the clip #5 is recorded. This cache synchronization operation causes the number of rewrite times to become 2. As a result, the number of rewrite times becomes inconsistent.

According to an embodiment of the present invention, when data cached in the memory are written to the disc, an RUB for the data on the disc is closed. Data are written to an RUB preceded by the closed RUB. When this process is performed, inconsistency of the number of rewrite times that takes place when data are written in a smaller unit than the minimum record unit of the record medium and a decrease of the process speed due to an increase of the number of times of the read operation by the read modify write can be suppressed.

Figure 17:
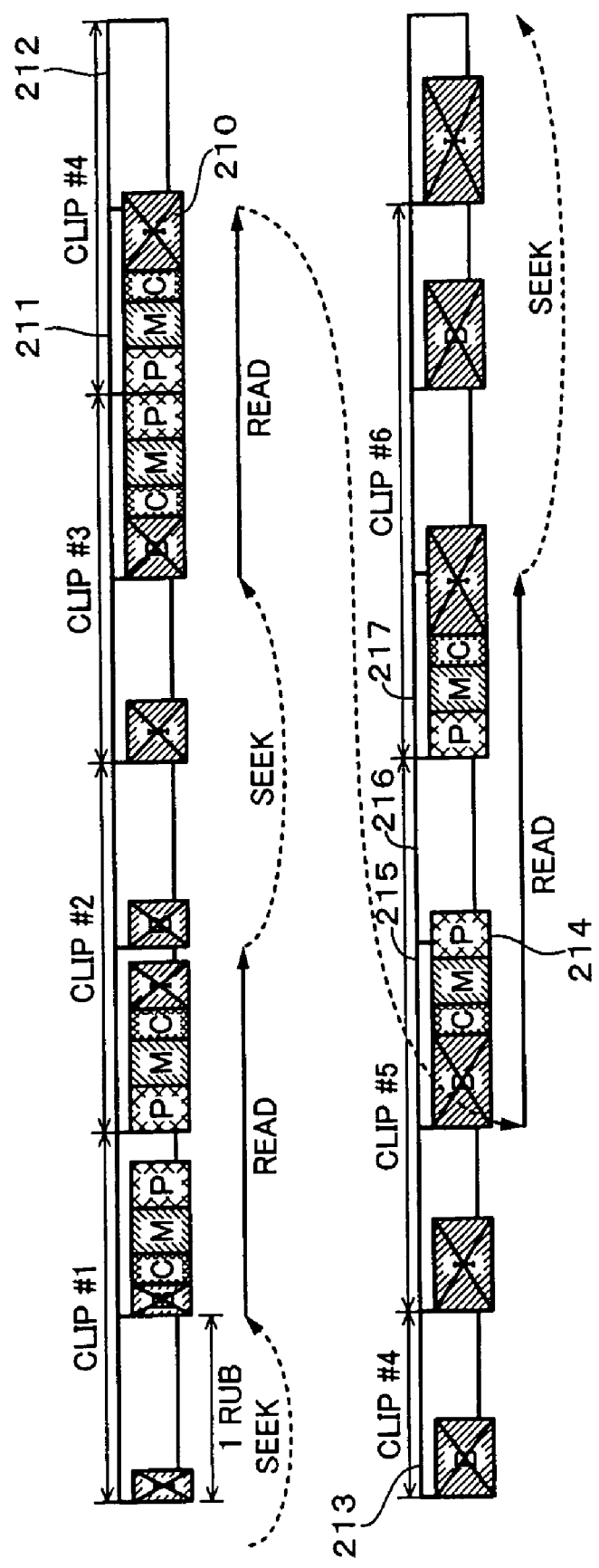
FIG. 17 is a schematic diagram describing a record method of a non-real time meta data file according to an embodiment of the present invention.

Next, with reference to FIG. 17, a method of recording a non-real time meta data file according to an embodiment of the present invention will be described. In FIG. 17, an order of non-real time meta data files is the same as that shown in FIG. 14. In other words, for odd number clips (a clip #1, a clip #3, a and clip #5 shown in FIG. 17), an index file I, a backup file B, a clip information file C, an non-real time meta data file M about a clip, and a picture pointer file P are successively allocated. For even number clips (a clip #2, a clip #4, and a clip #6 shown in FIG. 17), positions of a non-real time meta data file M about a clip and a picture pointer file P are reversed from those for odd number clips. In addition, for even number clips, positions of a non-real time meta data file M about a clip and a picture pointer file P and positions of an index file I and a backup file B are reversed from those for odd number clips.

In addition, an odd number clip and an even number clip are paired. Files are allocated so that when the optical disc 100 is mounted, non-real time meta data files M about clips and picture pointer files P are successively read.

In other words, for odd number clips, an index file I is written to a first RUB. A backup file B, a clip information file C, a non-real time meta data file M about a clip, a clip information file C, and an index file I are written to a next writable RUB. For even number clips, a picture pointer file P, a non-real time meta data file M about a clip, a clip information file C, and an index file I are written to a first RUB. A backup file B is written to a next writable RUB.

Next, when a total file size of successive non-real time meta data files written to an RUB exceeds a size of an RUB, the following process is performed. In the following process, the system control section 17 controls the drive control section 11 corresponding to a program stored in a ROM (not shown).

In the example shown in FIG. 17, as clips #4 to clip #6 are recorded, a size of an index file and a size of a backup file increase. As a result, such a situation takes place.

In the example of the clip #4, an index file 1210 has not been written to an RUB 211 and a part of the index file 1210 is written to an RUB 212. In this case, the following process is performed. A picture pointer file P, a non-real time meta data file M about a clip, a clip information file C, and the index file 1210 are cached in the buffer memory. At this point, since the part of the index file 1210 exceeds the data size of one RUB, the data of this portion are cached in an area of the adjacent RUB 212 of the buffer memory.

Since data for one RUB have been cached, the cached data are read from the buffer memory and written to an RUB 211 of the optical disc 100. When the data have been written to the RUB 211, it is closed. The write pointer is moved to the beginning of the next RUB 212. Thereafter, the part that has not been written to the RUB 211 of the index file 1210 is read from the buffer memory and recorded to an area of an RUB 212 of the optical disc 100. The write pointer is moved to the beginning of the next RUB 213. The backup file B is written to the RUB 213.

Likewise, for the clip #5, a picture pointer file P212 has not been written to an RUB 215. A part of the picture pointer file P214 has been written to an RUB 215. At this point, in the same manner as the clip #4, a backup file B, a clip information file C, a non-real time meta data M for a clip, and a picture pointer file P214 are cached in the buffer memory. At this point, since a part of the picture pointer file P214 exceeds the data size of one RUB, the data of this part are cached in an area of the adjacent RUB 216 of the buffer memory.

Since data for one RUB have been cached, the cached data of the RUB 215 are output from the buffer memory. The output data are written to an RUB 215 of the optical disc 100. After data have been written to the RUB 215, it is closed. The write pointer is moved to the beginning of a next RUB 216. Thereafter, the part that has not been written to the RUB 215 of the picture pointer file P214 is output and recoded to an RUB 216 of the optical disc 100. Thereafter, the RUB 216 is closed. Thereafter, the write pointer is moved to the beginning of the next RUB 217. The non-real time meta data file of the clip #6 are written to an RUB 217.

For the clip #6, the same process as the clip #4 is performed. Therefore, the detailed description of the process for the clip #6 will be omitted.

Thus, according to an embodiment of the present invention, even if the file management unit of the file system is smaller than the minimum record unit of the record medium, since the read modify write process is not performed, the data write speed is improved. In addition, since a record unit in which data are written is closed, the number of rewrite times of the whole record medium can be equalized.

According to the foregoing example, an embodiment of the present invention is applied to recording of non-real time meta data about AV data. However, the present invention is not limited to this example. In other words, when a data size of a data management unit of a file system is smaller than a data size of the minimum record unit of a record medium, an embodiment of the present invention can be applied to other systems that handle non-specific data. For example, an embodiment of the present invention can be applied to a record process of a device that handles non-specific data for a computer device or the like. The record medium is not limited to an optical disc. Instead, a record method of the present invention may be applied to disc-shaped record mediums using other record systems such as a magneto-optical disc and a hard disk.

It should be understood by those skilled in the art that various modifications, combinations, sub-combinations and alternations may occur depending on design requirements and other factors insofar as they are within the scope of the appended claims or the equivalents thereof.

What is claimed is:

1. A recording apparatus, comprising:
a memory configured to store data in segments of a first unit size;
a recording section configured to write data to an optical disc in segments of a second unit size, which is larger than the first unit size; and
a recording control section configured to control the recording section, read data from the memory, cause the recording section to write the data read from the memory to the optical disc in a first segment of the second unit size, close the first segment in which the data of the optical disc have been written, and set a write start position of the optical disc to a second segment of the second unit size following the closed first segment, wherein
the recording control section gathers a plurality of pieces of non-real time meta data corresponding to one clip and causes the recording section to record the gathered plurality of pieces of non-real time meta data in segments of the second unit size to the optical disc, and
the recording control section controls the recording section to record the plurality of pieces of the non-real time meta data corresponding to the one clip in a unit of a set composed of a plurality of segments of the second unit size to the optical disc and successively record the segments of the second unit size containing the non-real time meta data every two sets.

2. The recording apparatus as set forth in claim 1,
wherein the recording control section gathers a plurality of types of data managed in the memory and causes the recording section to record them in segments of the second unit size to the optical disc.

3. The recording apparatus as set forth in claim 2,
wherein the recording control section successively allocates the plurality of types of data to the memory, causes the memory to store them and causes the recording section to record them to the optical disc.

4. The recording apparatus as set forth in claim 1,
wherein when an amount of data stored in the memory is larger than a segment of the second unit size, the recording control section divides the data stored in the memory into the first segment and the second segment excluding the first segment and causes the recording section to record the first segment and the second segment to the optical disc.

5. The recording apparatus as set forth in claim 1,
wherein the recording control section causes the memory to store data in segments of the first unit size and reads data in segments of the second unit size.

6. The recording apparatus as set forth in claim 1,
wherein the recording control section controls the recording section to record at least video data on a clip by clip basis to a first area of the optical disc and non-real time meta data corresponding to each clip of the video data to a second area of the optical disc.

7. The recording apparatus as set forth in claim 1,
wherein the recording control section successively allocates the plurality of pieces of the non-real time meta data to the memory, causes the memory to store them, causes the memory to output the plurality of pieces of the non-real time meta data in segments of the second unit size, and causes the recording section to record them to the optical disc.

8. The recording apparatus as set forth in claim 1,
wherein the recording control section reads the plurality of pieces of the non-real time meta data from the optical disc when the optical disc is mounted.

9. A recording method, comprising:
storing data in segments of a first unit size to a memory, wherein the data includes a plurality of pieces of non-real time meta data corresponding to one clip;
reading data in segments of a second unit size from the memory, the segments of the second unit size being larger than the segments of the first unit size;
recording the read data in segments of the second unit size to the optical disc, wherein the recording includes recording the plurality of pieces of the non-real time meta data corresponding to the one clip in a unit of a set composed of a plurality of segments of the second unit size to the optical disc and successively recording the segments of the second unit size containing the non-real time meta data every two sets;
closing a first segment of the second unit size in which data of the optical disc have been written; and
setting a write start position of the optical disc to a second segment of the second unit size following the closed first segment.

10. A memory including computer program instructions, which when executed by a computer device, cause the computer device to execute a recording method, comprising:
storing data in segments of a first unit size to a memory, wherein the data includes a plurality of pieces of non-real time meta data corresponding to one clip;
reading data in segments of a second unit size from the memory, the segments of the second unit size being larger than the segments of the first unit size;
recording the read data in segments of the second unit size to the optical disc, wherein the recording includes recording the plurality of pieces of the non-real time meta data corresponding to the one clip in a unit of a set composed of a plurality of segments of the second unit size to the optical disc and successively recording the segments of the second unit size containing the non-real time meta data every two sets;
closing a first segment of the second unit size in which the data of the optical disc have been written; and
setting a write start position of the optical disc to a second segment of the second unit size following the closed first segment.

11. A recording apparatus, comprising:
a recording section configured to record a plurality of clips in segments of a predetermined unit size to an optical disc; and
a recording control section configured to control the recording section to write the plurality of clips to the optical disc,
wherein each of the plurality of clips contain a clip information file and a meta data file about a clip, and
wherein the recording control section groups a first odd number clip and a second even number clip of the plurality of clips as a set, allocates the first and second clips as the set so that an order of the clip information file and the meta data file of the first clip is different from that of the second clip, and records the allocated first and second clips to the optical disc.

12. The recording apparatus as set forth in claim 11,
wherein each of the plurality of clips also contain a picture point file that represents offset information of each frame position of compression-encoded video data, and
the recording control section allocates the first and second clips as the set so that an order of the picture point file and the meta data file of the first clip is different from that of the second clip and records the allocated first and second clips to the optical disc.

13. The recording apparatus as set forth in claim 11,
wherein the recording section records only one of the clip information file and the meta data file in a segment of the predetermined unit size.

* * * * *